United States Patent
Do Carmo

(10) Patent No.: US 12,018,199 B2
(45) Date of Patent: Jun. 25, 2024

(54) FIRE RETARDANT AND FIRE BLOCKING COMPOSITION FOR USE IN FOREST FIRES, AND METHOD OF MAKING SAME

(71) Applicant: José Roberto Do Carmo, Balneário Camboriú (BR)

(72) Inventor: José Roberto Do Carmo, Balneário Camboriú (BR)

(*) Notice: Subject to any disclaimer, the term of this patent is extended or adjusted under 35 U.S.C. 154(b) by 57 days.

(21) Appl. No.: 17/310,157

(22) PCT Filed: Jan. 24, 2020

(86) PCT No.: PCT/BR2020/050012
§ 371 (c)(1),
(2) Date: Jul. 21, 2021

(87) PCT Pub. No.: WO2021/146782
PCT Pub. Date: Jul. 29, 2021

(65) Prior Publication Data
US 2022/0348828 A1    Nov. 3, 2022

(51) Int. Cl.
*C09K 21/00* (2006.01)
*C09K 21/02* (2006.01)
(Continued)

(52) U.S. Cl.
CPC ............ *C09K 21/10* (2013.01); *C09K 21/02* (2013.01); *C09K 21/14* (2013.01); *C09K 2103/00* (2013.01)

(58) Field of Classification Search
None
See application file for complete search history.

(56) References Cited

U.S. PATENT DOCUMENTS

| | | | |
|---|---|---|---|
| 5,091,097 A | 2/1992 | Pennartz | |
| 5,593,485 A | 1/1997 | Wang | |
| (Continued) | | | |

FOREIGN PATENT DOCUMENTS

| | | |
|---|---|---|
| BR | PI0801820 A2 | 2/2010 |
| BR | PI0621993 A2 | 12/2011 |
| (Continued) | | |

OTHER PUBLICATIONS

Sidley Chem, "Applications of Carboxymethyl Cellulose Sodium in the Ceramic Glaze Slurry". Available at: < https://celluloseether.com/wp-content/uploads/2014/07/Applications-of-Carboxymethyl-Cellulose-Sodium-in-the-Ceramic-Glaze-Slurry.pdf >. Accessed on: Jan. 3, 2020.

(Continued)

*Primary Examiner* — Joseph D Anthony
(74) *Attorney, Agent, or Firm* — B. Aaron Schulman, Esq.; Stites & Harbison, PLLC

(57) ABSTRACT

The invention refers to a flame-retarding and flame-blocking agent in the form of a liquid suspension that efficiently slows down the progress of fire and at the same time, blocks forest fires, acting as a chemical firebreak and as a fire extinguisher, as well as to a method of making the suspension. The application process comprises spraying the diluted aqueous suspension/solution of the invention on a strip of land, forest, or silviculture, without harming the environment, animals, agricultural products, and humans. The product acts for a long time after application, is stable for storage, effective regardless of the water used for dilution, easily dispersible in water, biodegradable without containing toxic products or releasing highly toxic gases, and free of heavy metals. The product has a synergistic action between its components, and it is intended to save lives, natural resources and heritage.

13 Claims, 2 Drawing Sheets

(51) Int. Cl.
    *C09K 21/10*    (2006.01)
    *C09K 21/14*    (2006.01)
    *C09K 103/00*    (2006.01)

(56) References Cited

U.S. PATENT DOCUMENTS

| | | | |
|---|---|---|---|
| 7,070,704 | B2 | 7/2006 | Kang et al. |
| 9,132,569 | B2 * | 9/2015 | Saari .................. B27K 3/08 |
| 9,447,254 | B2 | 9/2016 | Chuda |
| 2010/0168263 | A1 | 7/2010 | Onishi et al. |
| 2010/0181084 | A1 * | 7/2010 | Carmo ............. A62D 1/0035 |
| | | | 169/45 |
| 2016/0346577 | A1 | 12/2016 | Ito |

FOREIGN PATENT DOCUMENTS

| | | |
|---|---|---|
| BR | PI1106423 B1 | 8/2013 |
| CN | 101376727 A | 3/2009 |
| CN | 101543672 A | 9/2009 |
| CN | 102614618 A | 8/2012 |
| CN | 102964892 A | 3/2013 |
| CN | 103263747 A | 8/2013 |
| CN | 103613874 A | 3/2014 |
| CN | 103641420 A | 3/2014 |
| CN | 103710875 A | 4/2014 |
| CN | 103717709 A | 4/2014 |
| CN | 104436511 A | 3/2015 |
| CN | 107684681 A | 2/2018 |
| CN | 110384888 A | 10/2019 |
| CN | 110433447 A | 11/2019 |
| CN | 111135522 A | 5/2020 |
| EP | 0718388 A2 | 6/1996 |
| EP | 2650118 A1 | 10/2013 |
| FR | 2102933 A5 | 4/1972 |
| GB | 2301122 A | 11/1996 |
| KR | 20020024513 A | 3/2002 |
| KR | 20030062707 A | 7/2003 |
| RU | 2686927 C1 | 5/2019 |
| WO | WO2004050760 A1 | 6/2004 |
| WO | WO2007091504 A1 | 8/2007 |
| WO | WO2012089981 A1 | 7/2012 |
| WO | WO2018172835 A1 | 9/2018 |

OTHER PUBLICATIONS

CETESB—Environmental Company of the State of Sao Paulo, Fish Mortality. "Organic Matter and Nutrients", São Paulo, 2019. Available at: <https://cetesb.sp.gov.br/mortandade-peixes/alteracoes-fisicas-e-quimicas/materia-organica-e-nutrientes>. Accessed on: Dec. 16, 2019. Machine Translated on: Dec. 20, 2021.
Halstead, W. "Thermal Decomposition of Ammonium Sulfate", Journal of Applied Chemistry, Apr. 1970, vol. 20, pp. 129-132. https://doi.org/10.1002/jctb.5010200408.
IUPAC—Nist Solubility Database. Available at: <https://srdata.nist.gov/solubility/sol_main_search.aspx > Accessed on: Dec. 27, 2019.
Marcelino. Rafael. Inibidor de nitrificação em fertilizantes nitrogenados e rendimento de milho. Dissertation (Master in Tropical and Subtropical Agriculture)—Instituto Agronomico de Campinas (IAC). 2009. Machine Translation on: Dec. 20, 2021.
Liborio Neves et al., "Produção de Metacaulinita a partir de Caulim da Região de Presidente Figueiredo, Am". In: Congresso Técnico Científico da Engenharia e da Agronomia—CONTECx 2018, Aug. 21-24, 2018, Maceió-AL, Brasil. Available at: <http://www.confea.org.br/sites/default/files/antigos/contecc2018/civil/166_pdmapdcdrdpfa.pdf >. Accessed on: Jan. 3, 2020. Machine Translated on: Dec. 20, 2021.
Prakasa Rao, Evs, et al., "Nitrification and ammonia volatilisation losses from urea and dicyandiamide-treated urea in a sandy loam soil", Plant and Soil, 1987, vol. 97, pp. 201-206.
Santiago, Antonio Dias et al., Adubação mineral [on line]. Available at: < https://www.agencia.cnptia.embrapa.br/gestor/cana-deacucar/arvore/CONTAG01_38_711200516717.html > Accessed on: Jan. 8, 2020. Machine Translation on: Dec. 20, 2021.
Schaber, Peter et al. "Thermal Decomposition (Pyrolysis) of Urea in an Open Reaction Vessel", Thermochimica Acta, 2004, vol. 424, Issues 1-2, pp. 131-142. ISSN 0040-6031, https://doi.org/10.1016/j.tca.2004.05.018.
Soares. Johnny R. Emissão de N20 e opções de mitigação pela aplicação de fertilizantes nitrogenados no cultivo de cana-de-açúcar. Thesis (Doctorate in Tropical and Subtropical Agriculture)—Instituto Agronomico de Campinas (IAC). 2006. Machine Translated on: Dec. 20, 2021.
Vick, Mariana. Por que a Austrália enfrenta uma onda de incêndios. Nexo [online]. São Paulo, Jan. 2020. Available at: < https://www.nexojornal.com.br/expresso/2020/01/03/Por-que-a-Austrália-enfrenta-uma-escalada-de-incendios >. Accessed on: Jan. 6, 2020. Machine Translated on: Dec. 20, 2021.
Vilsmeier, K. et al., "Urea, ammonium sulfate and dicyandiamide transformation in Costa Rican soils". Fertilizer Research, 1987, vol. 12, pp. 255-261.
YSTRAL Dispemix—110% Mixing Solutions. Machines. Dispermix. Available at: <https://ystral.com/en/machines/dispermix/ >. Accessed on: Dec. 16, 2019.
International Search Report dated Oct. 23, 2020 from corresponding application PCT/BR2020/050012 (4 pages).

\* cited by examiner

FIRE RETARDANT AND FIRE BLOCKING COMPOSITION FOR USE IN FOREST FIRES, AND METHOD OF MAKING SAME

CROSS-REFERENCE TO RELATED APPLICATIONS AND CLAIM TO PRIORITY

This application is a national stage application of International Application No. PCT/BR2020/050012 filed Jan. 24, 202, the disclosure of which is incorporated herein by reference and to which priority is claimed.

FIELD OF THE INVENTION

The invention refers to a flame-retarding and flame-blocking agent in the form of a liquid suspension that efficiently slows down the progress of fire and at the same time blocks forest fires, acting as a chemical firebreak and as a fire extinguisher, as well as to a process of making same. The process of application occurs by spraying the diluted aqueous suspension/solution of this composition on a strip of land, forest, or silviculture, without harming the environment, animals, agricultural products, and humans. The product is very effective in preventive or direct firefighting, blocks large-scale fire from the strip of plant substrate where it is applied, acts for a long time after application, regardless of residual moisture, is used in low product concentration in relation to dilution water, is stable for storage in both concentrated suspension and diluted solution regardless of the physicochemical characteristics of the water used for dilution, is easily dispersible in water, is biodegradable without containing toxic products or releasing highly toxic gases, and is free from heavy metals, organophosphate or organohalogen. All components are widely approved and used in agriculture and have no ecotoxicity. In this way, we have a compound of synergistic action between its components, eco-friendly, and intended to save lives, natural resources, and heritage.

BACKGROUND AND SUMMARY OF THE INVENTION

In recent years, a series of large-scale forest fires has caused enormous human and material damage and has received global attention. Forest fires stand out in densely populated areas, such as in California (United States), Portugal and Spain, as well as in the Brazilian and Peruvian Amazon rain forest. More recently, forest fires of enormous proportions, especially in the states of Victoria and New South Wales, Australia, reached at least 58,000 km², claimed at least 23 human lives, 400 million animal lives, and displaced at least 100,000 people, causing a rush of thousands of people towards the beaches[1].

Fire control and suppression are based on action on the necessary elements of the chemical reaction that generates and maintains fire. Such a reaction is an oxide-reduction reaction, exemplified below for the generic case of fires in organic materials, as occurs in forest fires:

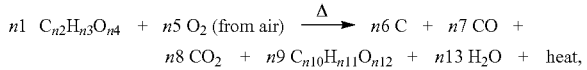

(Eq. 1)

where:

$C_{n2}H_{n3}O_{n4}$=Fuel (reducing reagent); $O_2$=oxygen in the air (oxidizing reagent); C, CO, $CO_2$, $C_{n10}H_{n11}O_{n12}$, $H_2O$=reaction products; Δ=activation energy; and n1 to n13=very variable stoichiometric indices, depending on the specific conditions of the reaction.

From this reaction, four components present at the fire site are necessary for its ignition and maintenance, the so-called fire tetrahedron: the fuel, the oxidizing agent (air), the activation energy, and the maintenance of a chain reaction. All the technologies to suppress, block the progress or prevent the ignition of fire that have been developed over time, are based on the removal or inhibition of one or more of these 4 constituents.

The oldest techniques are physical asphyxiation, that is, removal from contact with air, covering the burning part with a fireproof material or spray water, which at the same time stifles combustion, while evaporation removes the heat needed as activation energy.

Another old technique is to clean the soil of plants and combustible organic materials on a strip of land, so that fire is extinguished by the lack of fuel in that strip and does not advance further, a process known as a physical firebreak.

Chemical extinguishers are based on spraying foam of non-combustible material that adheres to combustible material, which removes contact with air.

Other techniques are based on the generation of products under fire conditions that are not subject to oxide-reduction and displace one or more of the three constituents, such as the generation of non-combustible gases that locally displace oxygen from the air and/or remove heat necessary as activation energy by evaporation, followed by adiabatic expansion of the reaction products. In this case, there are most recent products and techniques, which we will explained in detail below.

Amongst the specific products for fire control, the Chinese patent CN101543672 discloses a fire extinguishing material, preparation method and application to control intense fires in flammable oils or chemicals, consisting of a component A being an inorganic silicate, a component B being a foaming, surfactant and dispersant agent, a component C being water, a component D being an antifoam agent, a material resistant to fire, a material that decomposes at high temperature, generating a fire retardant gas, a water absorbent material, a colloidal material, and a filling material.

British patent GB199510552A deals with flame retardant compositions to be applied as sealing additives and fire insulators on solid surfaces, such as paper, cardboard, wood, straw, shrub, tree, etc. with a wide range of possible raw materials. In total, 23 raw materials are cited, however, of the examples cited, only mixtures between 4 to 10 components are used.

Chinese patent CN103641420A corresponds to a fire-retardant coating applied to tunnels, containing refractory cement, sulpho-aluminate cement, urea-formaldehyde resin, magnesium hydroxide, aluminum hydroxide, sepiolite, and ethylcellulose.

Chinese patent CN1037108 75A corresponds to a sound absorbing non-woven cotton fabric, where a flame-retardant product containing clay nanoparticles is applied.

Chinese patent CN103613874A describes polystyrene flame retardant foams containing polystyrene, discarded plastic, aluminum sulfate, aluminum trioxide, calcium carbonate, type A bisphenol polycarbonate, polyvinylpyrrolidone, urea, zinc oxide, magnesium oxide, and a modified filler.

Patent WO2012089981A1 corresponds to an aqueous fire-retardant composition, for blankets of mineral fibers and the resulting blanket, which contains dimers of alkyl ketenes and alkenyl succinic anhydrides.

European patent EP2650118A1 corresponds to an insulating panel for use in construction, which comprises a foam insulating layer and at least one layer of reinforced flame-retardant adhesive composite, that retardant adhesive composed of polycondensation adhesives, inorganic adhesives and/or polyurethane, preferably one or more products of urea/formaldehyde, melanin and other polycondensation products mixed with silicates and/or kaolin.

Chinese patent CN102964892A describes a high efficiency flame retardant used in paints, consisting of paraformaldehyde, urea, ammonium polyphosphate, bentonite, talc, fly ash and artificial mica.

Chinese patent CN103263747A describes a starch-based fire extinguishing agent, comprising starch, a flame retardant, a surfactant, an antiseptic and anti-mold agent, and an anti-sedimentation agent.

Chinese patent CN101376727A discloses a composite material ("composite") and preparation method for expanded polypropylene in which the material is polypropylene, additives for compatibility with polymers, organic clay, expansive flame retardant, rare earth oxide or thickening agent soluble in water, and water. The flame retardant agent is a source of acid and carbon gas with a mass ratio of 3-1:1, where the source of acid gas is ammonium phosphate, ammonium polyphosphate, urea phosphate or melanin phosphate and the carbon source is pentaerythritol, pentaerythritol dimer, pentaerythritol tripolymer, phenolic resin, dextrin, or starch.

Patent WO2007091504A1 describes a fire-retardant composition for polystyrene resin composed of styrene resin, brominated organic compound and urea compound selected from urea, thiourea and derivatives thereof.

The patent WO2004050760A1 is a coating composition for fire protection, for example, used as a base paint (initiator) effective to make the final paint non-flammable and carbon-forming which uses urea in a wide list of materials.

EP718388A2 corresponds to a fire protection substance, and method of production of such substance, applied to solid substrates such as steel or wood, which can also provide protection to substrates that can be regenerated, such as forests, and that do not have halogen-forming agents. Raw materials include water-soluble dehydrators, such as urea phosphate, monoammonium phosphate or diammonium phosphate.

Brazilian patent PI0621993-4, owned by Radix Assessoria e Consultoria, a company whose partner is the inventor of the present patent, discloses a composition against the spread of fire, which uses 0.5 to 2% of an alkanolamine, such as triethanolamine, 9 to 13% of a strong alkali such as caustic soda, 1.8 to 3% of a strong acid, preferably one sulfonic acid, 32 to 40% of a fatty acid, preferably ricinoleic acid, 0.3 to 0.8% of a soluble amide, preferably urea, and the balance in water.

Brazilian patent PI0801820-0, also owned by Radix Assessoria e Consultoria, a company whose partner is the inventor of the present patent, presents a formulation of a blocking and firefighting agent, consisting of a formulation with 4 to 7% of a soap from castor oil, 12 to 30% sodium bentonite, 40 to 80% technical urea, and 0.1 of 0.18% triethanolamine dodecyl benzene sulfonate, and an alternative formulation consisting of 15 to 55% urea, 12.5 to 60% ammonium sulfate, 3.5 to 7% of castor oil and 0 to 1% of triethanolamine. The usage concentration is 0.5 to 30 g/L, with a density of 1.05 g/cm$^3$.

Brazilian patent PI 1106423-4 discloses an encapsulated nitrogen fertilizer with extinguishing action and blocking the advance of fire, which is composed of 50 to 80% of prilled urea, encapsulated by an external layer composed of 5 to 20% of vegetable oil, 0 to 5% phosphoric acid, 0.005 to 7% guar gum, 0 to 5% powdered graphite, 0 to 15% dolomitic limestone, 0 to 80% potassium chloride, and 0 to 20% gypsum. The main function of fertilizer encapsulation is to physically protect urea from the well-known nitrogen loss that occurs naturally in the soil, by leaching or through the action of nitrifying microorganisms, such as *Nitrobacter nitrosomonas*, in addition to providing other important fertilizing elements.

Currently existing patents and technologies have the following disadvantages and technical limitations, resolved by the present invention.

The invention of the Chinese patent CN101543672 presents a very wide list of possible materials, even with evident mismatch between functions for the same class of components. For example, it will be easily understood by a person skilled in the art that none of the components referred to as D components simultaneously meet the conditions of anti-foaming agent, fire resistant material, material that decomposes at high temperature generating a fire-retardant gas, water-absorbing material, colloidal material, and filler material, see for example urea, which is only a fire-retardant gas generating agent and nothing else. Nor is it concerned with the stability of ammonium compounds, that is, it does not contain ammonium acidic salt, such as ammonium sulfate, and therefore in aqueous solutions (and therefore because it contains as a mandatory component C water), continuous and marked losses of gaseous ammonia will occur during the manufacture, transportation and storage of the product, before its final use, with considerable risks to health, the environment and the efficiency in the application.

Regarding the British patent GB199510552A, nowhere in the specification of this patent are the most important issues for applications in direct fighting forest fires on a large scale, such as the use of the mixture in liquid form or stabilization of the mixture in water, not releasing gaseous ammonia, except at the time of the fire, whether the product is stabilized in dilute aqueous solutions, its effectiveness as a direct combat product and immediate application as a chemical fire retardant, since in all its uses it is necessary to dry the substrate firstly before application, that is, water is used only as a means of application and penetration into solid media. In all examples, ammonium phosphate or diammonium phosphate is used, which is allowed in the context of use for protection against flames on previously prepared solid substrates, but which is impossible to use in forest firefighting, due to the eutrophication of aquatic environments caused by phosphorus salts. The use of sulfuric acid in the examples generally makes sense only in the context of use as protection previously applied as an additive to textile fibers, but it is not feasible in fighting forest fires, due to the high environmental risk of the acid.

Chinese patents CN103641420A, CN103710875A, CN103613874A, disclose very specific compositions for flame proofing in building composite materials and polymers. The patent CN103613874A presents the additional problem of employing type A bisphenol, a polymer responsible for hormonal, neurological and carcinogenic changes, once used in bottles and currently banned in the European Community.

Patents WO2012089981A1, EP2650118A1, and CN102964892A also correspond to flame-retardant compositions, however they are flame retardants for blankets, composite materials, and paints, that is, they cannot be used for blocking large scale forest fires.

Chinese patent CN103263747A describes a fire extinguisher, but it is not adapted for large-scale forest fires.

Chinese patent CN101376727A and patent application WO2007091504A1 correspond to polymeric resins containing a flame retardant therefore they do not fulfill the function of blocking forest fires.

Patent WO2004050760A1 is an anti-flame coating, used as a base paint ("primer") to transform the final coating paint into non-flammable material, therefore it is not used in forest fires.

European patent EP718388A2 corresponds to fire protection to be applied to solid substrates such as steel or wood, that is, it is not suitable for forest fires.

Brazilian patent PI0621993-4 presents a compound to fight the spread of fire, however, according to the experience of the author of the present patent, who is a partner of the patent PI0621993-4 holder, when presenting a soap with a very low content of urea as the final product, the product has only a lowering effect on the flames, not acting as a "chemical firebreak", that is, it does not effectively block the progress of the fire. Furthermore, by indicating a saponification reaction of a triglyceride (rapeseed oil) with strong alkali (caustic soda) and a reaction of neutralization of dodecylbenzene sulfonic acid with caustic soda (the term "sulfonic acid" is used in this patent as commercial synonym the "dodecylbenzene sulfonic acid"), the pH of the resultant product is necessarily alkaline, which causes rapid decomposition of urea lost in the form of ammonia gas, as explained later by equation 2, and confirmed by tests 1 to 4 herein in the tests section. Also, the alkaline pH and long-lasting presence of soap and anionic detergent on the leaves caused burning and death of the leaves and branches that is in contact with the product in the long term.

Brazilian patent PI0801820-0, represented an evolution of the product of the patent PI0621993-4, presenting a greater reduction of flame. However, according to the experience of the author of this patent, who is a partner of the patent PI0801820-0 holder, the product was also not effective in blocking fire, generating only a reduction in the height of the flames. To understand why this happened, it is necessary to understand the limits of volumes of gases generated by the formulations discovered by the present patent, and the synergistic relationship between the components that, surprisingly, were effective as blockers of large forest fires, such limits only discovered due to the exhaustive tests carried out to elaborate the present patent.

When we consider the content and concentration limits of components for the product of the present patent, and taking in consideration the effects demonstrated by tests 17 and 20 shown here in the test section, we have the following calculations for molar volumes of generated gases:

Considering the final concentrations shown in Test 17, where we have the lowest concentration of urea, combined with the greater concentration of ammonium sulfate, from which the product starts to function only as a flame retardant, having no more action as total and immediate blocker of fire;

Considering that the formed gases expand at infinite dilution at free air, at a high temperature, without compression effects, and at a substantially atmospheric pressure. Thus, we will consider that all molar volumes are equal for any molecule, that is, the van der Waals equation for real gases becomes the Clapeyron equation for ideal gases. Thus, regardless of the generated gas molecule, and the number of atoms in it, the volume of generated gas is directly proportional to the number of generated moles, and can be directly added to obtain the total volume of gases forming the suppressive effect of the fire;

The generated water steam was considered as an ideal gas.

We have at the lower limit for urea, when urea starts to act as a non-blocking fire retardant (test 17):

$$N_{Urea,Min.} = \%_{Urea,Min.}/MOL_{Urea}$$

Where:

$N_{Urea,Min.}$=Number of moles percentage for the minimum urea $\%_{Urea,Min.}$=Minimum percentage of urea, by weight $MOL_{Urea}$=molecular weight of urea, in g-mol So:

$$N_{Urea,Min.} = 0.96/60.06 = 0.015984016 \text{ moles \%}$$

We have, according to equation 3, of urea decomposition, presented in the next section, the following molar ratios of reagents and products:

TABLE 1

Percent moles generated by the minimum of urea in the present invention

| Molecule | Decomposition reaction molar ratio | Molar % |
| --- | --- | --- |
| Reagent urea | 1 | 0.015984016 |
| Product $NH_3$ | 2 | 0.031968032 |
| Product $CO_2$ | 2 | 0.031968032 |
| Total urea-generated gases | | 0.063936064 |

Correspondingly, we have for the higher limit for ammonium sulfate, in the same formulation that contains the minimum urea (test 17):

$$N_{Sulfate,Max} \%_{Sulfate,Max}/MOL_{Sulfate}$$

Where:

$N_{Sulfate,Max}$: Number of moles percentage for the maximum of ammonium sulfate $\%_{Sulfate,Max}$=Maximum percentage of ammonium sulfate by weight $MOL_{surface}$=Molecular weight of ammonium sulfate, in g-mol So:

$$N_{Sulfate,Max.} = 2.965/132.14 = 0.022438323 \text{ moles \%}$$

We have, according to equation 4, for decomposition of ammonium sulfate, presented in the next section, the following molar ratios of reagents and products:

TABLE 2

Percent moles generated by the maximum ammonium sulfate in the present invention

| Molecule | Decomposition reaction molar ratio | Molar % |
| --- | --- | --- |
| Reagent sulfate | 1 | 0.022438323 |
| Product $NH_3$ | 1.33 | 0.029917764 |
| Product $SO_2$ | 1 | 0.022438323 |

TABLE 2-continued

Percent moles generated by the maximum ammonium sulfate in the present invention

| Molecule | Decomposition reaction molar ratio | Molar % |
|---|---|---|
| Product $H_2O$ | 2 | 0.044876646 |
| Product $N_2$ | 0.33 | 0.007479441 |
| Total sulfate-generated gases | | 0.104712174 |

Total molar volume of gases generated by the product at the minimum non-blocking concentration=0.063936064+0.104712174=0.1668648238 moles %

Correspondingly, we have at the lower limit for ammonium sulfate, when ammonium sulfate starts to act as a non-blocking fire retardant (test 20):

$$N_{Sulfate,Min.} = \%_{Sulfate,Min.}/MOL_{Sulfate}$$

Where:

$N_{Sulfate,Min.}$=Number of mole percentages for the minimum sulfate $\%_{Sulfate,Min}$=Minimum percentage of sulfate, by weight $MOL_{Sulfate}$=Molecular weight of sulfate, in g-mol So:

$$N_{Sulfate,Min.}=1.15/132.14=0.008702891 \text{ moles \%}$$

We have, according to equation 4, of decomposition of ammonium sulfate, presented in the next section, the following molar ratios of reagents and products:

TABLE 3

Percent moles generated by the minimum ammonium sulfate in the present invention

| Molecule | Decomposition reaction molar ratio | Molar % |
|---|---|---|
| Reagent sulfate | 1 | 0.008702891 |
| Product $NH_3$ | 1.33 | 0.011603854 |
| Product $SO_2$ | 1 | 0.008702891 |
| Product $H_2O$ | 2 | 0.017405782 |
| Product $N_2$ | 0.33 | 0.002900964 |
| Total sulfate-generated gases | | 0.040613491 |

Correspondingly, we have for the higher limit for urea, in the same formulation that contains the minimum ammonium sulfate (test 20):

$$N_{Urea,Max.} \%_{Urea,Max}/MOL_{Urea}$$

Where:

$N_{Urea,Max}$ Number of moles percentage for the maximum urea $\%_{Urea,Max}$=Maximum percentage of urea, by weight $MOL_{urea}$=molecular weight of urea, in g-mol So:

$$N_{Urea,Max.}=2.776/60.06=0.046220446 \text{ mol \%}$$

We have, according to equation 3, of urea decomposition, presented in the next section, the following molar ratios of reagents and products:

TABLE 4

Percent moles generated by the maximum urea in the present invention

| Molecule | Decomposition reaction molar ratio | Molar % |
|---|---|---|
| Reagent urea | 1 | 0.046220446 |
| Product $NH_3$ | 2 | 0.092440892 |
| Product $CO_2$ | 2 | 0.092440892 |
| Total urea-generated gases | | 0.184881785 |

Total molar volume of gases generated by the product at the minimum non-blocking concentration=0.040613491+0.184881785=0.225495276 moles %

In this way, we can conclude from the tests carried out, that the total fire blocking occurs with a minimum of gases generated at least between 0.1686 moles % and 0.2255 moles %.

Now, we will analyze the maximum volume of gases generated in the final formulation for field application use in the field cited and claimed by the previous patent PI0801820-0:

maximum content of urea claimed in the formulation with ammonium sulfate: 55%; minimum content of bentonite: 12.5%; minimum content of castor oil: 3.5%; ammonium sulfate balance: 100-55-12.5-3.5=29%; maximum use concentration=30 g/L; and density of the solution: 1.05.

So, we have for the maximum urea concentration:
Urea: 0.55×30/1050=1.57% by weight; Ammonium Sulfate: 0.29×30/1050=0.83% by weight, or 1.57/60.06=0.026140526 moles % urea; and 0.83/132.14=0.006281217 moles % ammonium sulfate.

Then applying the same calculations performed previously for the lower limits of the product of the present patent:

TABLE 5

Percent moles generated by the maximum urea in patent PI0801820-0

| Molecule | Decomposition reaction molar ratio | Molar % |
|---|---|---|
| Reagent urea | 1 | 0.026140526 |
| Product $NH_3$ | 2 | 0.052281052 |
| Product $CO_2$ | 2 | 0.052281052 |
| Total urea-generated gases | | 0.104562105 |

Correspondingly:

TABLE 6

Percent moles generated by ammonium sulfate with the highest urea content in patent PI0801820-0

| Molecule | Decomposition reaction molar ratio | Molar % |
|---|---|---|
| Reagent sulfate | 1 | 0.006281217 |
| Product $NH_3$ | 1.33 | 0.008374956 |
| Product $SO_2$ | 1 | 0.006281217 |
| Product $H_2O$ | 2 | 0.012562434 |
| Product $N_2$ | 0.33 | 0.002093739 |
| Total sulfate-generated gases | | 0.029312345 |

Total gas generated by formulation with greater field application concentration and with the greatest possible content of urea claimed by the patent PI0801820-0=0.104562105+0.029312345=0.13387445 moles %

Correspondingly, for the highest ammonium sulfate content in patent PI0801820-0: maximum ammonium sulfate content claimed in the formulation: 60%; minimum bentonite content: 12.5% minimum castor oil content: 3.5%; urea balance: 100-60-12.5-3.5=24%; maximum use concentration=30 g/L; and density d the solution: 1.05.

So, we have for the maximum ammonium sulfate concentration:
Urea: 0.60×30/1050=1.71% by weight; Ammonium sulfate: 0.24×30/1050=0.686% by weight, or 1.71/60.06=0.028471528 mole % urea; 0.686/132.14=0.005191464 mole % ammonium sulfate.

Then applying the same calculations performed previously for the lower limits of the product of the present patent:

TABLE 7

Percent moles of urea generated by the maximum content of ammonium sulfate in patent PI0801820-0

| Molecule | Decomposition reaction molar ratio | Molar % |
| --- | --- | --- |
| Reagent urea | 1 | 0.028471528 |
| Product $NH_3$ | 2 | 0.056943057 |
| Product $CO_2$ | 2 | 0.056943057 |
| Total urea-generated gases | | 0.113886114 |

Correspondingly:

TABLE 8

Percent moles generated by ammonium sulfate with the highest sulfate content in patent PI0801820-0

| Molecule | Decomposition reaction molar ratio | Molar % |
| --- | --- | --- |
| Reagent sulfate | 1 | 0.005191464 |
| Product $NH_3$ | 1.33 | 0.006921951 |
| Product $SO_2$ | 1 | 0.005191464 |
| Product $H_2O$ | 2 | 0.010382927 |
| Product $N_2$ | 0.33 | 0.001730488 |
| Total sulfate-generated gases | | 0.02422683 |

Total gas generated by formulation with greater final concentration and the greatest possible content of ammonium sulfate claimed by the patent PI0801820-0=0.113886114+0.02422683=0.13811294 mol %, i.e., for the greatest possible final concentration, the product covered by the patent PI0801820-0 generates A MAXIMUM of between 0.1339 and 0.1381 moles % by volume of gases, while the product covered by the present patent generates A MINIMUM of between 0.1686 and 0.2285 moles % as volume of gases. The volumes of gases generated by the minimum concentration of total mixture claimed in the patent PI0801820-0, which is only 0.5 g/L of solution, will not even be calculated, as evidently, they will be so small that they are equivalent to very diluted solutions, with only ⅙ of these maximum volumes, already ineffective. Attention is drawn to the fact that the descriptive report of patent PI0801820-0 presents no test or experiment of burning or controlled fire using the claimed product. In addition, the object of the patent PI0801820-0 does not solve the problem of the generation/loss of ammonia in the alkaline medium, and neither the nitrification by microorganisms abundant in forests.

Product from Brazilian patent PI1106423-4, as it contains only urea as a gas generator, will also act only as a flame height reducing agent, because this is the characteristic of the compositions that contain only urea as a gas generator. As demonstrated by the exhaustive tests of the present invention, namely in tests 17 and 20 presented below, there is a synergistic effect between the components of the product object of this invention, so that when the content of any of the active components is reduced below an experimentally determined, minimum value, the corresponding increase in the content of the complementary component does not compensate for this reduction. Thus, using only one of the gas-generating components has only a moderating effect on the fire, and does not achieve the same surprising effect of the total and immediate blocking of the fire in the strip where the solution/suspension object of the present patent is applied. In addition, while claiming the possibility of alternative use of encapsulated urea fertilizer as a firefighting agent, the patent specification PI1106423-4 does not present a single test, or experiment, or bibliographic proof, of the use of the formulation claimed in firefighting, limiting itself to speculative statements.

Although current technologies are effective in reducing the intensity of flame propagation, especially in flame retardant agents applied to substrates, they have not combined factors to solve the typical practical problems of fighting and blocking fire in large-scale fires, such as fires in forests. Such practical needs are:

The product in a concentrated state needs to be stable in the long term since fires generally occur at a low frequency and in specific seasons. A specific problem is that, in products containing high temperature flame retardant gas builders, such as urea, there is an unwanted release of gas during storage, with loss of active material and, most importantly, contamination of the environment and users by toxic gas, in the case of urea by ammonia ($NH_3$), problem solved by the product object of the present invention, by a mixture of powders in a chemically stable solution/suspension that will not release gases in the environment regardless of environmental conditions, throughout all the product shelf-life;

The product must be stable also after dilution in water, as there is usually a reasonable time between dilution and application, in addition to being convenient to store the diluted product that remains from the applications, for later use, a problem solved by the product object of the present patent, through a chemically stable solution/suspension, even after the final dilution in the water that will be used in the formation of the chemical firebreak;

The product must be effective in direct firefighting, as an extinguishing agent, as well as in indirect firefighting, as a blocking agent, that is, in case of large fires, we cannot await for the product drying time, it must work even if diluted in water, in addition to maintaining efficiency at any residual moisture, a problem solved by the product from the present patent, as it presents fire blocking efficiency, and not only a decrease in flame intensity, both in a diluted form in water and in a dry form on forest and soil substrates;

It is desirable to provide a chemical firebreak, that is, when firefighting in large areas, it is usual to clear the forest soil on a strip of land not yet affected by the wildfire, with the intention to stop the fire, but in a too large wildfire, very often, there is no time to remove the forest substrate; also in tall canopy forests, fire is transmitted through canopies, passing over the strip of physical firebreak. It is important that the product would be not just a fire retardant, when used as a chemical fire blocker, it must completely inhibit and stop the fire, in the range on which the diluted product was applied, without the need for deforestation. Currently available commercial products, for example, are classified as long-term fire retardants, that is, they generally slow down the advance and decrease the height of the flames in order to ease fighting, but they are not blocking the fire progress, so they cannot to be considered providers of chemical firebreaks (fire blockers), a problem solved by the product object of the present patent, when presenting efficiency as a blocker for the advance of wildfire;

A fire-blocking product should be efficient in blocking major fires since shortly after the application until a long time after the application because the chemical firebreak may have to be applied from a point close to the fire advancing fronts until points far away from the fire, which can take up days to reach the blocking strip. In addition, the product must be effective to avoid re-ignition of the fire even after controlling it, a problem solved by the product covered by the present patent, which has efficiency both in the diluted form as in the dry form on the forest substrate, until 17 days after application;

Due to the high energy involved in forest fires, the very fast dynamics of the fires, and the high risk for firefighters, it is necessary to combine the insulating effects of the air-fuel contact locally, the generation of incombustible gases that displace oxygen and reduce the heat expansion of gas and heat loss by evaporation of water, all in a short time, problem solved by the product object of this patent by fast isolation of air-fuel contact on the surface of the substrate, fast activation of reactions producing incombustible gas by the heat of the fire when it approaches the product application range, and by the evaporation of the product's dilution water when the fire approaches;

It is important that the product can be effectively used in the lowest possible concentration, in relation to the dilution water, to reduce the costs of acquisition, transportation, storage and use. As a parameter to compare the effective water concentration, the value from 13.6% by weight to 20% by weight of recommended concentration should be used, for example, by chemical retardants Phos-Check® LC-95® and 2 59F® from ICL Performance products, which are the most used products on the market, problem solved by the product object of the present invention by diluting the water component in a proportion between 6.0 and 7.5% by weight of non-aqueous components;

Raw materials cannot be toxic to firefighting personnel or to the environment, even in the long run, and waste products cannot pollute the environment. Particularly important is the absence of organic phosphates, heavy metals and organohalogenates, a problem solved by the product covered by the present patent, which does not contain any toxic products, all components being fertilizers, biodegradable or biologically inert;

It is convenient that the product be presented in a concentrated liquid form, with ease of immediate dispersion when diluted, especially in the emergency conditions typical of fighting forest fires, when there is no time to lose and sometimes in the absence of adequate mechanical agitation equipment. For example, the products currently used, present a difficult dispersion of the components in the dilution water, needing 72 hours of forced product recirculation, until obtaining a homogeneously dispersed product, solved by the product object of the present patent through a presentation in form of concentrated aqueous solution/suspension easily dispersible without special equipment;

It is necessary for the product to be effective with the use of locally available water, and, due to the need for application in remote locations, neutral water is not always available, a problem solved by the product of this patent, when using a process for control of pH that allows long-term use, even when using water with a very alkaline pH; and It is necessary that the product is not corrosive to materials that come into contact with the solution during storage, transport, and application, particularly in tanks and structures of applicators and airplanes, a problem solved by the product object of the present patent by a composition that does not employs corrosive raw materials and has a final pH close to neutrality.

"FIRE RETARDANT AND FIRE BLOCKING COMPOSITION FOR USE IN FOREST FIRES, AND PROCESS OF PREPARATION THEREOF", object of the present invention, was developed to effectively overcome the problems presented in the state of the art in firefighting products for great proportions wildfires, being a liquid composition with materials in concentrated solution and a small top layer in suspension, easily dispersed and diluted in water, stable at long-term storage, stable after storage diluted in water, effective both for directly fighting direct forest fires and for protection against the advance of the fire, enabling the creation of a chemical firebreak, chemical raw materials are not toxic for people, animals and the environment, and the waste products are biodegradable or inert minerals that make up the substrate soil.

In the vast majority of cases of practical use of the product, the approach of fire generates a high temperature in the component materials of the solution/suspension, which generates non-combustible gases such as ammonia ($NH_3$), nitrogen, carbon oxides and/or water steam. The blocking mechanism is due both to the local displacement of oxygen from the air in contact with fuel substrate, and to the removal of heat by evaporation of water and adiabatic expansion of the formed gases. To produce a stable product in solution/suspension in water, when ammonia-forming agents, such as urea, are used, it is necessary to avoid premature formation, under pre-fire environmental storage/dilution/drying conditions, of volatile ammonia gases, originating from $NH_4^+$ ions in aqueous medium. This can occur both in the production of the liquid agent, as well as in storage or application. For example, neutral solutions containing urea can be easily alkalized by diluting with alkaline water. Due to the particularities of use in fire situations, where water sources cannot be chosen by quality criteria due to emergency situations, this usually occurs in practice, and gaseous ammonia can be released during storage or prolonged use of the product in aqueous suspension or solution. Urea is a gas generator that will decompose into ammonia, carbon dioxide and water steam by action of heat from the fire, but which also releases ammonia in alkaline media. One way to stabilize the gas-generating agent in long-term storage is to prevent decomposition of the agent, keeping the aqueous medium acidic and stable over the long term. The acidic medium acts as a shifter of the equilibrium of reversible hydrolysis reaction:

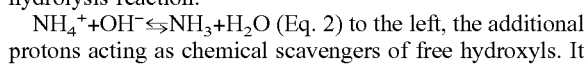
 (Eq. 2) to the left, the additional protons acting as chemical scavengers of free hydroxyls. It is also important for the same product to be useful in the fire blocking mechanism and to be stable and non-corrosive. The invention uses a nitrogenous gas-generating compound, such as urea, plus a compound of weak acid character, such compound generating non-combustible gases and being soluble in water. The chosen compound was ammonium sulfate, in combination with urea, to share the fire blocking mechanism, allowing its synergistic use in significant quantities, without large variations in pH in the long term, even under very different storage conditions, and independent of the pH of the water used for dilution. The generation of ammonia, carbon dioxide, sulfur dioxide, nitrogen and water steam, all non-combustible gases, or vapors at the site of contact of the fire blocker product with the forest substrate, is activated by the action of fire and is given by the decomposition reactions:

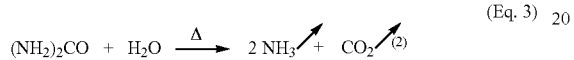
(Eq. 3)

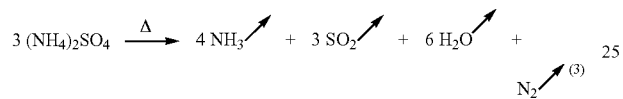
(Eq. 4)

The fire blocking product object of the present patent also uses complementary mechanisms that act in synergy with the decomposition of urea and ammonium sulfate, as explained below, and is additionally composed of:

At least one non-combustible compound that promotes product adhesion to plants and soil, which make up the range of forest substrate corresponding to the chemical firebreak from which the fire will be blocked. The incombustible product also promotes the isolation between the combustible organic material and the air, removing the oxygen supply needed for the fire. The appropriate product is kaolin, which is a very fine hydrated, fireproof aluminum silicate. Additionally, kaolin dehydration occurs between 500° C. and 900° C.[10], which can contribute to the cooling of the fire, although this effect has not been quantified. To facilitate the dispersion of the material, we chose to use very fine particles in suspension, with a median particle diameter distribution (d50) between 1 and 2 μm.

At least one compound that promotes easy dispersion of the suspension in water, and that keeps the solids in suspension during the storage of the concentrated product, the product of choice being sodium carboxymethyl cellulose (CMC);

At least one wetting agent to reduce surface tension, to promote both the rapid dispersion of the product in water and the wettability and contact of the diluted solution/suspension with the forest substrate, in any degree of drying (residual moisture), and at the same time avoiding the formation of foam in the stirring and mixing and in the stored suspension, such agent can be high molecular weight polyglycols, such as polypropylene glycol with an average molecular weight of 2000 (PPG 2000) or an alkoxylated alcohol, such as BYK Dynwet® 800N, from BYK Additives, or a similar product; The reduction of surface tension, by preventing the solution/suspension, when dry, from recrystallizing on the vegetable substrate in a spherical droplet format and consequently generating small spheres of solid product with little contact area with the substrate, is fundamental to keep the product evenly spread on the substrate in the form of a film, and thus to allow its effects on the entire available surface;

Water, to suspend the powders and facilitate dilution in locally available water;

At least one organic acidity regulating component, to lower the pH of the solution/suspension medium, making it sufficiently acidic to prevent the formation of free ammonia during the production steps of the concentrated solution/suspension, product storage, dilution in water, application on the vegetal substrate or soil, and natural drying of the diluted product until the fire arrives. The acidity regulating component can be an organic acid, such as ascorbic acid, citric acid, tartaric acid, fumaric acid, or other usual in the food industry. To verify the acidification limits necessary to prevent the formation of free ammonia when diluting the solution/suspension in water from natural alkaline sources, we consider dilution water from lakes or another interior source of fresh water turned highly eutrophic by algae or cyanobacteria, whose upper pH limit can reach pH 11.[4]

at least one nitrification inhibiting agent inhibitor for keeping urea for long term on the substrate, avoiding attack by nitrifying bacteria which turn urea in nitrate. Microorganisms present in the soil or in the substrate metabolize urea nitrogen over time into gaseous nitrogen and nitrogen oxides, causing loss of material. The agent chosen was dicyandiamide (DCD), as it is known to be efficient in the preservation of urea in the soil and substrate, it is a bacteriostatic specific to nitrifying bacteria, it has low toxicity, and has a fertilizing effect[5], [6]. Another nitrification inhibitor, such as 3,4-dimethylpyrazole-phosphate (DMPP), can also be used.

It will be understood through the results of the many efficiency tests carried out to optimize the formulation, and described below, that the synergy between the fire retardant and fire suppressive effects of the components of the product formulation, produced the unprecedented and surprising effect of blocking the progress of the fire when it reaches the strip where the product was applied in diluted aqueous solution, and not only delayed or decreased the intensity of the fire, and that this blocking effect occurs at any time after application, either immediately, when the solution/suspension is still diluted in plenty of water, either after drying of the water, this blocking effect extending for a long time after application, so that the term "chemical firebreak" is quite accurate to describe the method and result of applying the product.

BRIEF DESCRIPTION OF THE DRAWINGS

For a better understanding of the present patent, the following figures are attached.

DETAILED DESCRIPTION OF THE PREFERRED EMBODIMENT(S)

Figure 1:
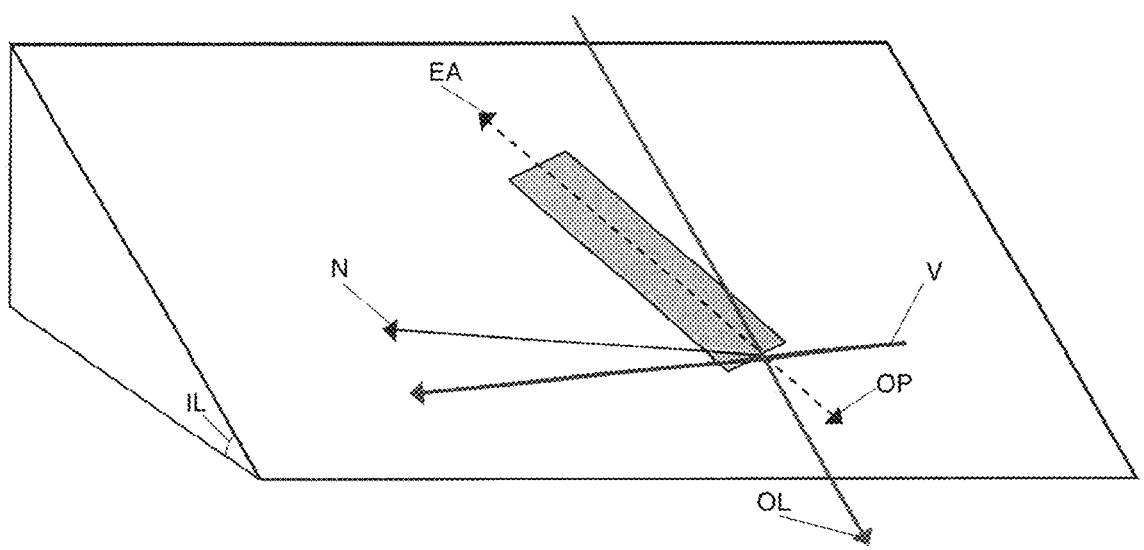
FIG. 1., which shows the schematic view in perspective of the forest plot that was the object of the large-scale forest fire test (test 28), using the product object of the present patent.

To produce the test prototypes that set the limits of product composition, and evaluated its effectiveness as a forest fire blocker, and to adjust the best production process, the following procedures were adopted:

Process I: Production of the concentrated liquid suspension/solution:
  Add the concentration water to a jacketed vessel with indirect heating by water steam, with a high turbulence and dispersion stirrer, of the Dispermix® type[7] or equivalent;
  After heating to the desired temperature, add the acidity regulating agent until reaching the pH determined in the test;
  Add the incombustible mineral adhesion-promoting agent, and disperse it in the medium under agitation, keeping the temperature controlled;
  Turn the water steam flow off, and add urea and ammonium sulfate under stirring;
  Finally, after the urea and ammonium sulfate dissolution time, add the dispersion facilitating agent, the wetting agent and the nitrification inhibiting agent;
  Wait for the concentrated solution/suspension to cool, and pack it in closed containers.

Process II: In-field dilution of the concentrated solution/suspension:
  When the product is used in fighting or preventing the spread of forest fires, dilute the solution/concentrated liquid suspension in dilution water, using mild stirring/dispersion, preferably by the conventional method of recirculating the solution/suspension to a vessel by pumping.

In the search for the best formulation and optimization of the concentrated fire blocking solution/suspension, object of the present patent, calculations and tests were carried out, among which we chose the most important ones, described below:

Set of tests identified as Tests 01 to 04: Determination of the pH limits for the water of the concentrated product:

Test 1: 100 grams of technical urea were dissolved in 1000 mL of alkaline water with a pH previously measured at 9.10. pH measured after the solution was 9.12. Approximately 32 hours after dilution the solution was found to release ammonia through one piece of litmus paper placed in the air over the glass beaker turning from red to pale blue.

Test 2: 100 grams of technical urea and 30 grams of ammonium sulfate were dissolved in 1000 mL of alkaline water with a pH previously measured at 9.10. pH measured after the solution was 6.3. After 32 hours from dilution, no ammonia release was detected by the litmus test, nor it was any ammonia smell detected.

Test 3: 100 grams of technical urea and 30 grams of ammonium sulfate were dissolved in 1000 mL of alkaline water with a pH previously measured at 11.2, in an Erlenmeyer flask. pH measured after the solution was 8.3. A strip of litmus red paper was duly placed over the mouth of the Erlenmeyer flask to detect the release of gaseous ammonia. After 32 hours of dilution, although no ammonia smell was detected, the litmus paper turned pale blue, indicating that free ammonia was released.

Test 4: in an Erlenmeyer flask, 1000 mL of alkaline water with a pH previously measured at 11.2 was acidified with ascorbic acid until the pH was measured at 4.0. 100 grams of technical urea and 30 grams of ammonium sulfate were dissolved in this medium, and the pH measured after the solution was 6.3. A strip of litmus red paper was duly placed over the mouth of the Erlenmeyer flask to detect the release of gaseous ammonia. After 32 hours of dilution, no smell of ammonia was detected, and no release of ammonia was detected by the litmus test.

Considering that the case of using, for in-field dilution of the concentrated product, water with a high alkaline pH of 11 coming from streams with a very eutrophic water is the most critical to be found in practice, took the pH 4.0 as the upper limit for acidification of the concentration water in the production process of the concentrated solution/suspension. To establish the lower limit of pH, we chose the smaller value used in the tests of efficacy and stability, which was 3.2. The weight concentration of ascorbic acid never exceeded 2% in relation to the concentration water, in any of the tests, and the weight content of ascorbic acid is irrelevant for the process control, so it was decided to always refer to the final pH of the concentration water as a control parameter of the acidification phase in the production process of the concentrated solution/suspension object of the present patent.

Determination of the concentration water content and its limits:

The weight content of water to be used in the production of the concentrated solution/suspension was calculated considering the solubilities of urea and ammonium sulfate in water, with the following considerations:
  Solubilities as a function of temperature were extracted from the series of tables of the International Union of Applied Chemistry (IUPAC);[8]
  Tabulated data were used to determine two water solubility curves for urea and ammonium sulfate, respectively, as a function of temperature. Both were adjusted by polynomial regression for a polynomial function of order 5, for urea, and order 6 for ammonium sulfate, in an MS Excel spreadsheet. The coefficients of correlation $R^2$ of data were 0.999999999975559 for the solubility of urea and 0.99999796 for the solubility of ammonium sulfate indicating an excellent correlation between the experimental and calculated data. In any case, whenever a given temperature chosen for the calculation of the saturation concentration had tabulated experimental results, the experimental result was used, not the calculated result;
  As the urea-ammonium sulfate-water ternary system consists of an ionizable salt (ammonium sulfate) and an amide of negligible ionization (urea), the solubility of the system was the result of the solubilities of the individual binary systems;

Calculation of the upper limit for the content of concentration water in the concentrated solution/suspension:
  As ammonium sulfate is more soluble (by weight) than urea for the extreme temperature considered, the upper limit of urea and the lower limit of ammonium sulfate in the formulation were used as the calculation limit, as determined in test 18 indicated later;
  The extreme temperature considered was zero ° C. for the upper limit of concentration water. At this temperature, the solubilities of urea and ammonium sulfate are:
$Sol._{Urea}$=66.7 g/100 g of water;
$Sol._{Sulfate}$=70.6 g/100 g of water;
  In this case, it is more critical to consider the highest possible functional content of urea, combined with the lowest possible functional content of ammonium sulfate, as urea is the least soluble component at zero ° C. Thus, the upper limit of the water content of the suspension has a safety margin for ease of dispersion and homogenization. The calculation was performed as below:

Maximum urea content: 44.07% (Dry Weight Basis); Minimum content of ammonium sulfate: 21.37% (DBW); Average content of kaolin: 30.71% (DWB); Average content of CMC: 0.53% (DWB); and Average content of polypropylene glycol PPG 2000: 3.345%.

Using as a base 100 g of product on the Dry Weight Basis, the calculation of the maximum weight water content is:

Weight of urea: 44.07 g; Weight of ammonium sulfate: 21.37 g; Weight of Kaolin: 30.71 g; Weight of CMC: 0.52 g; Weight of polypropylene glycol PPG 2000: 3.345 g; Weight of water to dissolve urea=44.07×100/66.7=66.072 g; Weight of water to dissolve ammonium sulfate=21.37×100/70.6=30.269 g; Total weight=100 g+66.072 g+30.269 g+30.269 g=196.34 g; and maximum content of water=96.34/196.34=49.08% 50%.

It is readily understood from the teachings of this invention that the water content of the concentrated product has as a technical upper limit a much higher content of water, corresponding to the limit of formulation when diluted in water in the final in-field application, but its practical applicability as a commercially available product would be compromised, being convenient to produce the solution/suspension as concentrated as possible for storage and transport to the application site, and dilute it as close as possible to the in-field application.

Calculation of the lower limit for the content of concentration water in the concentrated solution/suspension:

It may be usual and convenient to use a lower concentration, since, for example, in the Amazon rainforest, the minimum annual water temperature is 25° C. In addition, it was observed in the tests that, even when some supersaturation of the ammonium sulfate solution and concentrated urea occurs, the crystals formed are small, which allowed them to be easily dispersed in the dilution process.

In this case, it is more critical to consider the highest possible functional content of urea, combined with the lowest possible functional content of ammonium sulfate, as urea is the most soluble component at 25° C. The calculation was performed as below:

Interpolation of the urea solubility value at 25° C.:

TABLE 9

| Urea solubility as a function of temperature: | |
| --- | --- |
| Temperature (° C.) | Solubility (g/100 g of water) |
| 0 | 66.7 |
| 20 | 108 |
| 40 | 167 |
| 60 | 251 |
| 80 | 400 |
| 100 | 733 |

Source: IUPAC Solubility Data Series [8]

Source: IUPAC Solubility Data Series[8]

Figure 2:
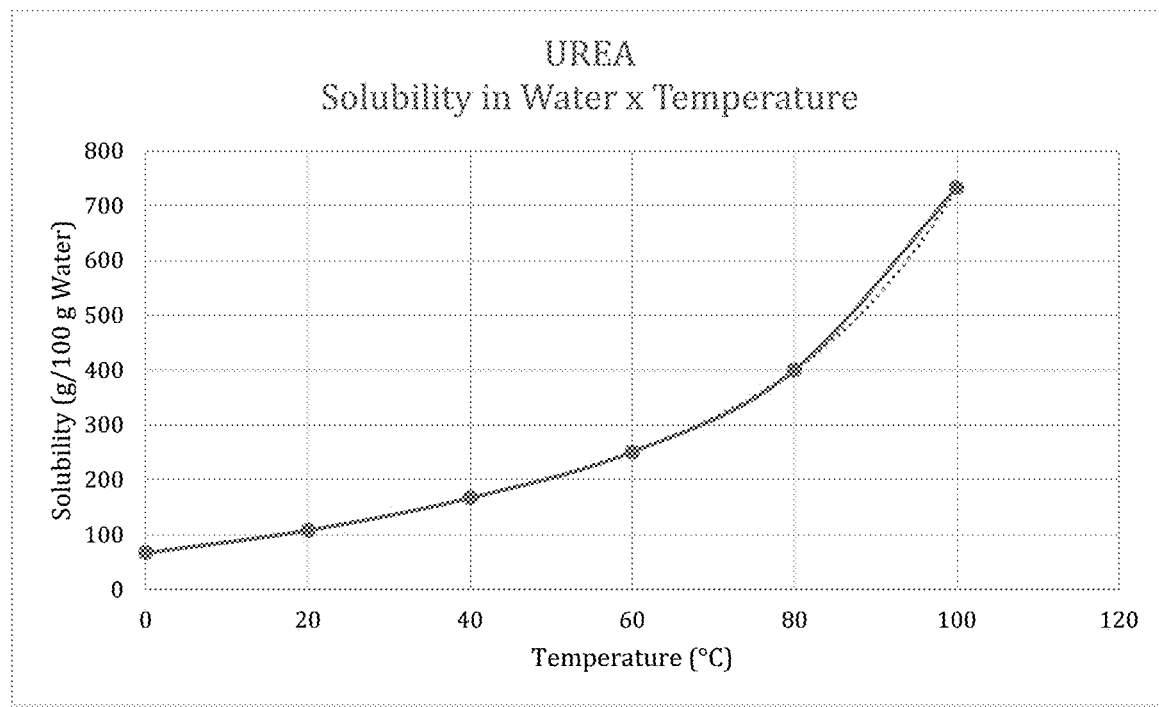
FIG. 2., which shows the solubility curve of urea as a function of temperature, used to calculate the water content of the product in concentrated solution/suspension, object of the present patent.

The data in Table 9., generated the graph of FIG. 2. with the respective polynomial fit curve of order 5, obtained by curve fitting function from the datasheet software "Microsoft® Excel® 2017 for Mac®".

Applying the polynomial regression of order 5 from Microsoft Excel to data from table 9., we obtained the coefficients a5 to a0 from polynomial equation tabulated below in Table 10:

$Sol._{Urea,T} = a5 \times T^5 + a4 \times T^4 + a3 \times T^3 + a2 \times T^2 + a1 \times T + a0$, where: T=Temperature, in ° C.; $Sol._{Urea,T}$=Solubility of urea at temperature T, in g of solute/100 g of water; a5 to a0=Coefficients obtained from the polynomial regression.

TABLE 10

Coefficients and degree of correlation of polynomial regression of order 5 for solubility of UREA in water as a function of temperature

| Coefficient | Value |
| --- | --- |
| a5 | $1.20572916664785 \cdot 10^{-7}$ |
| a4 | $-1.55989583334737 \cdot 10^{-5}$ |
| a3 | $8.18229166725359 \cdot 10^{-4}$ |
| a2 | $2.23958333481278 \cdot 10^{-3}$ |
| a1 | $1.79841666657012$ |
| a0 | $66.699999976463$ |
| $R^2$ | $0.999999999975559$ |

Due to the correlation coefficient being quite close to 1, we can use this polynomial regression equation to interpolate the urea solubility at 25° C.:

$Sol._{Urea,25°C} = 1.20572916664785 \cdot 10^{-7} \times 25^5 - 1.55989583334737 \cdot 10^{-5} \times 25^4 + 8.18229166725359 \cdot 10^{-4} \times 25^3 + 2.23958333481278 \cdot 10^{-3} \times 25^2 + 1.79841666657012 \times 25 + 66.699999976463 = 120.93$ g/100 g Interpolation of the solubility value of ammonium sulfate at 25° C.:

TABLE 11

| Solubility of ammonium sulfate as a function of temperature | |
| --- | --- |
| Temperature (° C.) | Solubility (g/100 g of water) |
| 0 | 70.6 |
| 10 | 73 |
| 20 | 75.4 |
| 30 | 78.1 |
| 40 | 81.2 |
| 50 | 84.3 |
| 60 | 87.4 |
| 80 | 94.1 |
| 100 | 103 |

Source: IUPAC Solubility Data Series[8]

Figure 3:
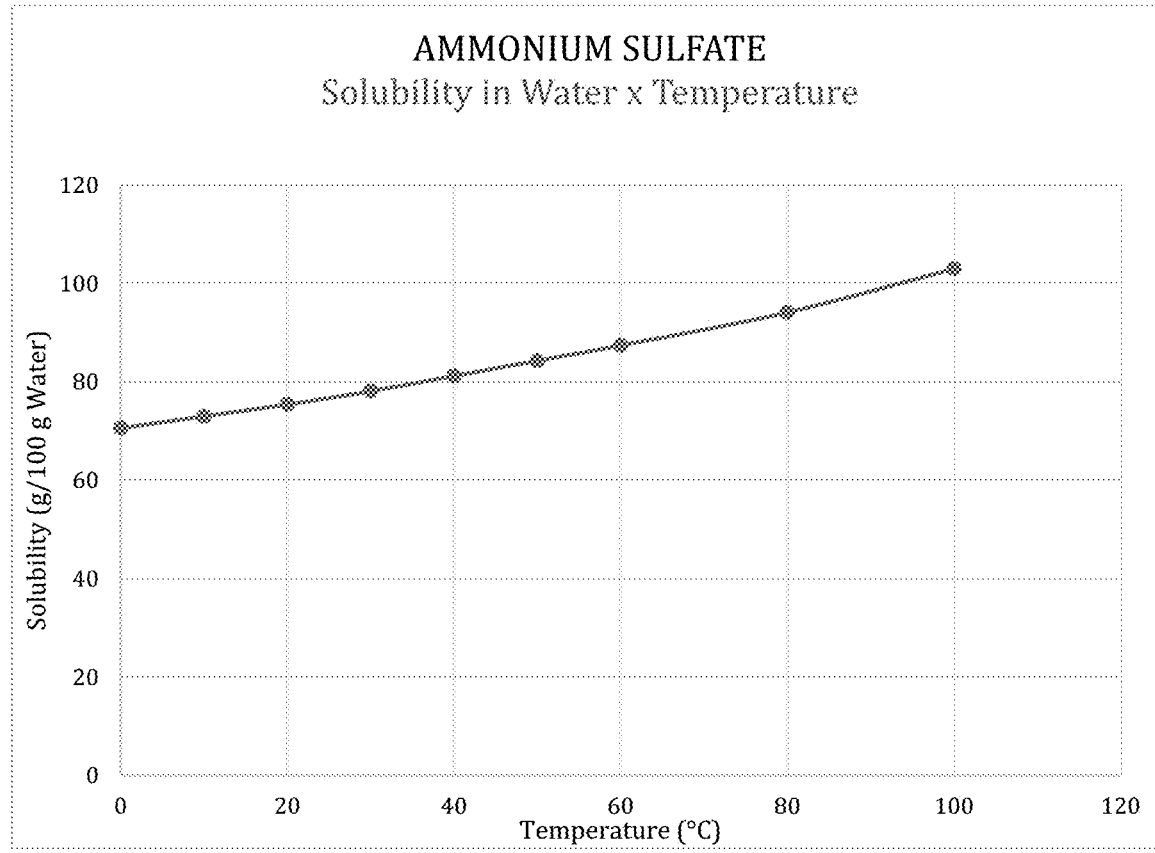
FIG. 3., which shows the solubility curve of ammonium sulfate as a function of temperature, used to calculate the water content of the product in concentrated solution/suspension, object of the present patent.

The data in Table 11., generated the graph of FIG. 3. with the respective polynomial fit curve of order 6, obtained by curve fitting function from the datasheet software "Microsoft® Excel® 2017 for Mac®".

Applying the polynomial regression of order 6 from Microsoft Excel to data from table 11., we obtained the coefficients a6 to a0 from polynomial equation tabulated below in Table 12:

$Sol._{Sulfate,T} = a6 \times T^6 + a5 \times T^5 + a4 \times T^4 + a3 \times T^3 + a2 \times T^2 + a1 \times T + a0$ Where:

T=Temperature, in ° C.;

$Sol._{Sulfate,T}$=Solubility at temperature T, in g of solute/100 g of water;

a 6 to a0=Coefficients obtained from the polynomial regression.

TABLE 12

Coefficients and degree of correlation of polynomial regression
of order 6 for solubility of AMMONIUM SULFATE in water
as a function of temperature

| Coefficient | Value |
| --- | --- |
| a6 | $-1.95655142966062.10^{-10}$ |
| a5 | $6.13135158339384.10^{-8}$ |
| a4 | $-7.00335750636327.10^{-6}$ |
| a3 | $3.55558855517302.10^{-4}$ |
| a2 | $-6.83212946569256.10^{-3}$ |
| a1 | $0.280196290579624$ |
| a0 | $70.5985967963716$ |
| $R^2$ | $0.999999999975559$ |

Due to the correlation coefficient being quite close to 1, we can use this polynomial regression equation to interpolate the solubility of ammonium sulfate at 25° C.:

Sol.$_{Sulfate, \ 25°\ C.}$=$-1.95655142966062.10^{-10} \times 25^6$+ $6.13135158339384.10^{-8} \times 25^5 - 7.00335750636327.10^{-6} \times 25^4 + 3.55558855517302.10^{-4} \times 25^3 - 6.83212946569256.10^{-3} \times 25^2 + 0.280196290579624 \times 25 + 70.5985967963716 = 76.70$ g/100 g Considering then the most critical formulation in terms of allowing minimum water without recrystallization, we have:

Maximum urea content: 44.07% (Dry Weight Basis); Minimum ammonium sulfate content: 21.37% (DWB); Average kaolin content: 30.71% (DWB); Average CMC content: 0.53% (DWB); and Average Polypropylene glycol 2000 content: 3.345% (DWB).

These levels were determined according to the efficiency tests indicated below. Using as a base 100 g of product on a dry basis, the calculation of the minimum water content in weight is:

Weight of urea: 44.07 g; Weight of ammonium sulfate: 21.37 g; Weight of kaolin: 30.71 g; Weight of CMC: 0.53 g; Weight of polypropylene glycol PPG 2000: 3.345 g; Weight of water to dissolve urea=44.07×100/120.93=36.44 g; Weight of water to dissolve ammonium sulfate=21.37×100/76.7=27.86 g; Total weight=100 g+36.44 g+27.86 g=164.3 g; Minimum water content=64.3/164.3=39.13%≈39%.

Similarly to what occurs with the upper limit for water content calculated for the concentrated solution/suspension object of the present patent it is evident from the teachings of this invention that the concentrated product has as technical lower limit of water content the dry product, i.e., with zero % water, but its practical applicability and commercial attractiveness would be compromised, because the product would lose the characteristic of quick and easy dispersion and dilution under the conditions and application requirements in forest fires. On the other hand, it was possible, as shown in the tests below, to even allow a certain recrystallization of urea and ammonium sulfate in the solution/suspension, as the crystals formed in the recrystallization became very thin, and the dispersion of the concentrated product when diluting in water for final application remained easy. We consider a minimum concentration of 38% of water by weight as a safe limit for easy dispersion and dilution.

After these preliminary tests, several samples were taken, evaluated by measures of stability and effectiveness of the product for firefighting, as well as stability measures for storage. The results were also used to determine the content limits for the components of the formulation. The methodologies were:

Test method A. Laboratory scale-controlled fire test

This test simulates a small-scale controlled fire, so that it is possible to make fine adjustments to the composition of the product before checking it in a large-scale fire test. The test consists of measuring the effectiveness of the fire block in a portion of combustible material. 1 kg of dry wheat straw with residual moisture between 8% and 12% by weight is evenly spread over an entire surface of refractory tiles with a thickness of 5 cm, 90 cm wide and 150 cm long, to form a cover about 9 cm thick. Fuel oil is spread over a linear strip of 2 cm wide at one end of the cover and the product under analysis previously diluted in water is spread over straw in a linear strip 60 cm wide at the opposite end of the cover, at a certain density of application in liters of diluted product per application area (in L/m$^2$). The rate of fire advance is visually measured by means of a stopwatch, from the beginning until the arrival of the fire at the limit of the product range. The height of the flames is also measured by visual comparison with a ruler. Humidity and room temperature are monitored. After ignition, the ability of the sample to decrease the advance speed and/or stop (block) the fire in the range where the product was spread is checked. Also in this test, the time elapsed between the product application and the test ignition is chosen to allow the material to dry.

Test Method B. Large-Scale Controlled Fire Test in a Forest Plot:

This test simulates a forest fire in large proportions in a portion of artificial forest of known size, under controlled conditions to better simulation of actual fire conditions and higher test reproducibility. It consists of setting up a land 10 m long by 5 m wide, with young *Pinus elliottii* var. *elliottii*, with heights ranging from 1.80 m to 2.00 m, with distance between planted trunks of 1.0 m, and distance between the ground and the base of the cup branches of 0.80 m. In the soil, a covering of dry pine needles, with a thickness of 16 cm and a surface density of 20 tons/hectare, was spread. The product object of the present invention diluted in water is applied to a strip of 2 m long by 5 m wide, at the end of the portion opposite to the ignition of the fire, at a given volume ratio per area, in L/m$^2$ of land area and median canopy area, with the help of a backpack sprayer, spreading the solution from the ground to the canopy. The direction of fire advance is chosen at the time of the ignition of the test, so that the fire advances in the same direction as the wind, which makes the advance faster and more intense. The relative humidity during the test was between 35-45% and the local environment temperature was between 22° C. and 25° C. The temperature, as well as the height of the flame, were monitored by thermocouple sensors placed on the cover of aciculates at distances of 7.5 m, 8.5 m and 9.5 m since the start of the fire. A data logger with a sampling interval of 2 minutes was used to record temperatures during the test. The fire was started by diesel oil spread on a strip at the end opposite to the strip where the product was applied. The temperatures of the cover areas were measured, as well as the appearance of the plot after the extinction of the controlled fire. The time elapsed between the application and the test is also chosen to simulate conditions in which the water used in the application has dried, to test both the immediate effectiveness and the effectiveness of the product alone, without the influence of loss of heat by evaporation of water.

All the following samples were tested for effectiveness according to the above test methods.

Test 5: A sample of 4 kg of liquid product object of this invention was made by the procedure indicated above as process I, at the following experimental conditions (the percentages are in Dry Weight Basis, DWB):

Initial weighing of non-aqueous components, in the following quantities:

Ascorbic acid: not used in this test; Urea: 1.134 kg (37.8% DWB); Ammonium sulfate: 0.888 kg (29.61% DWB); Kaolin d50 1.6 µm: 0.8155 kg (27.18% DWB); Sodium carboxymethyl cellulose (CMC): 0.0092 kg (0.31% DWB); Polypropylene glycol PPG 2000: 0.1529 kg (5.10% DWB); Total weight of non-aqueous components: 3 kg.

These levels were initially estimated considering the most critical case, which would be the total drying of the product on the vegetable substrate. For the content of carboxymethyl cellulose, the content usually used for dispersing ceramic powders was initially considered ($^9$). For polypropylene glycol (PPG), it was chosen a high molecular weight PPG (average 2000 g-mol) having a content suitable for wetting the powders on vegetable substrate. As an initial estimate of the humectant concentration, a 5 g portion of a composition with the above proportions was diluted in water in the proportion of 7.5% composition to 92.5% water, by weight. Then, the diluted solution/suspension was applied to green leaves of eucalyptus (Mimosa scrabella) at a ratio of 1 L/m$^2$ of leaf surface area on a single face. The samples were allowed to dry in the open air, at an average temperature of 22° C. and an average relative humidity of 35%, for 48 h. The visual appearance of the substrate was observed during the drying process, and the formed film was homogeneous, without formation of droplets on the leaves, nor spherical concentrates in dried product.

All 3 kg of the raw materials so weighed were dissolved/dispersed in 1 kg of process water of pH 6.3, at a mixing temperature 80° C., thereby forming a solution/suspension of 25% water to 75% non-aqueous components. At this proportion, the soluble components are supersaturated, but since the entire content was later diluted in the dilution water, there were no consequences for the effectiveness of the performed tests.

The liquid product with suspended powders was diluted in water by process II above, in the proportion of 10% by weight of liquid product, corresponding to a diluted formulation for use of the concentration of 7.5% of non-aqueous components, with the following final composition (by weight): Urea: 2.83%; Ammonium sulfate: 2.22%; Kaolin d50 1.6 µm: 2.04%; Sodium carboxymethyl cellulose (CMC): 0.023%; Polypropylene glycol PPG 2000: 0.382%; and Water with pH 6.3: 92.5%.

Then, a controlled fire test in large proportions, according to test method B above, was carried out in a forest land, where the product was applied with an application density of 1.0 L/m$^2$, as explained in methodology of that test. In the first test, the time between application of the product and the test was 5 minutes. The flames reached an average temperature of 972° C. in the first thermocouple, 40° C. in the second thermocouple and 22° C. in the third thermocouple. The average speed of fire progress was 4 m/min. The result was expected to delay the flames, but surprisingly the complete stop of the fire was observed visually very close to the beginning of the applied product range.

Test 6: In the next test, the same product sample made in accordance with test 5 above, was applied under conditions similar to test 5, but the time between the application of the product and the start of the fire was 3 days and it was carried out a measurement of the residual moisture of a sample of the needles that cover the soil where the product was applied, removing 500 g of total sample in aleatory samples of approximately 50 g each. Residual humidity resulted in 8%, which constitutes a very dry cover. In this test, the flames reached an average temperature of 1022° C. in the first thermocouple, 60° C. in the second thermocouple and 23° C. in the third thermocouple. The average speed of the fire advance was 4.1 m/min, and again, surprisingly, the complete stop of the fire was visually observed as being very close to the beginning of the applied product strip.

Test 7: The product diluted in water of test 5 above was spread on dry wheat straw covering a surface of refractory tiling, according to the fire test described above as controlled laboratory test method A. An application density of 1.0 L/m$^2$ was used, and the period between the application of the product and the start of the fire was 1 minute. The fire started as described, the flames reached a height of approximately 60 cm and, when they reached the limit of the product's application range, they were almost immediately extinguished.

Test 8: The product diluted in water from test 5 above was spread on dry wheat straw covering a surface of refractory tiling, according to the fire test described above as controlled laboratory test method A. An application density of 1.0 L/m$^2$ was used, and the period between the application of the product and the start of the fire was 5 days. The fire started as described, the flames reached a height of approximately 50 cm and, when they reached the limit of the product's application range, they were almost immediately extinguished.

Test 9: A sample of the product from test 5 above was stored for 3 months, in ambient temperature conditions that varied between 19° C. and 32° C. At the end of the period, the pH of the suspension was 6.38. The ammonia release test was performed on litmus paper. The test was negative. In addition, the smell was mild, with no smell of ammonia.

Test 10: A 20 kg sample of the liquid product was made by process I indicated above, with the composition shown below. All portions are calculated on a on a dry weight basis.

Urea: 27.09% (DWB); Ammonium sulfate: 26.93% (DWB); Kaolin d50 1.6 µm: 40.53% (DWB); sodium carboxymethyl cellulose: 0.31% (DWB); and Polypropylene PPG 2000: 5.11% (DWB).

Due to the recrystallization of the powders in the water dissolution as occurred in test 5 above, it was decided to increase the water content of the solution/suspension to 40%, according to the already presented calculations. Thus, the above materials were dispersed and dissolved in the proportion of 40% water at pH 9.2 and 60% of non-aqueous components at 80° C. The solution/suspension pH was adjusted to 3.6 by adding 0.22% of ascorbic acid. The resulting solution/suspension, after cooling, had little material in suspension, corresponding to kaolin.

The liquid product with suspended powders was diluted in water with pH 9.2 by process II previously described, in the proportion of 10% by weight of concentrated liquid product on a wet basis, corresponding to a diluted formulation for use at 6.0% concentration in weight of non-aqueous components, with the following final composition: Urea: 1.62%; Ammonium sulfate: 1.616%; Kaolin d50 1.6 µm: 2.432%; Sodium carboxymethyl cellulose (CMC): 0.0184%; polypropylene glycol PPG 2000: 0.3064%; and water at pH 9.2: 94.0%.

The dilution was very easy, and the material quickly and homogeneously dispersed in the dilution water, with little agitation.

The product diluted in water was spread on dry wheat straw covering the surface of the refractory brick according to controlled fire laboratory test described above as Test method A. An application density of 1.0 L/m² was used• and the period between the application of the product and the start of the fire was 1 minute. The fire started as described, the flames reached a height of approximately 70 cm and, when they reached the limit of the product's application range, they were reduced to about 10 cm in height and then extinguished. The range of carbonized fuel was advanced by about 10 to 20 cm within the strip of deposited product.

Test 11: The product diluted in water from test 10 was spread over a strip of dry wheat straw in the same controlled fire laboratory test described in test method A above. The difference is that an application density of 0.5 L/m² has now been used, and the period between the application of the product and the start of the fire was 20 minutes. The fire started as described, the flames reached a height of approximately 60 cm and, when they reached the limit of the product's application range, they were reduced to about 10 cm and then extinguished. The range of carbonized fuel was advanced by about 50-60 cm within the strip of deposited product.

Test 12: The product diluted in water from test 10 was spread on a strip of dry wheat straw in the same controlled fire laboratory test described in test method A above. The difference is that an application density of 0.8 L/m² has now been used, and the period between the application of the product and the start of the fire was 20 minutes. The fire started as described, the flames reached a height of approximately 60 cm and, when they reached the limit of the product's application range, they were reduced to about 10 cm and then extinguished. The range of carbonized fuel was advanced by about 10 cm within the strip of deposited product.

Test 13: The product diluted in water from test 10 was spread on a strip of dry wheat straw, in the same controlled fire laboratory test described above as method A. The difference is that now it was used an application density of 0.5 L/m², and the period between product application and the start of the fire was 20 minutes. The fire started as described, the flames reached a height of approximately 60 cm and, when they reached the limit of the product's application range, they were reduced to about 10 cm and then extinguished. The range of carbonized fuel was advanced by about 50 cm within the strip of deposited product.

Based on the results of tests 11 to 13 above, the minimum safe application density of the product was considered to be 0.8 L/m².

Tests to Determine the Minimum Urea Content to be Used:

Clearly a determination of s contents minimum and maximum effectiveness of the components to ensure fire blocking effect of the object product of the present invention is in fact the determination of the effective minimum and maximum levels in the solution diluted to final application. Thus, to determine the minimum urea content, we performed the tests keeping the averages of the contents of non-aqueous components within the effective range (except for ammonium sulfate), reducing the urea content, and correspondingly increasing the sulfate content of ammonium in order to keep the balance at 100% on a dry basis, always calculated with the final content after dilution, according to the tests below:

Test 14: A 20 kg sample of the liquid product was made by process I indicated above, with the composition shown below. All portions are calculated in weight, on a wet basis.

Ascorbic acid: added to water up to pH 3.6, which corresponded to 0.25% of the total weight, at a temperature of 80° C.; Urea: 10.41%; Ammonium sulfate: 28.84%; Kaolin d50 1.6 μm: 18.42%; Sodium carboxymethyl cellulose (CMC): 0.32%; polypropylene glycol PPG 2000: 2.00%; and Process water: 40.00%.

The liquid product with suspended powders was diluted in water in the proportion of 10% by weight of product on a wet basis, corresponding to a diluted formulation for use in the concentration of 6.0% in weight of non-aqueous components by weight of total diluted product, with the following final composition: Urea: 1.041%; Ammonium sulfate: 2.884%; Kaolin d50 1.6 μm: 1.842%; Sodium carboxymethyl cellulose (CMC): 0.032%; Polypropylene glycol PPG 2000: 0.2%; and Water with pH 11: 94.0%.

The pH of the diluted solution was 6.6. The product diluted in water was spread on dry wheat straw that covers a refractory brick surface, according to the controlled fire laboratory test described as test method A above. Application was at a density of 1.0 L/m², and the period between product application and the start of the fire was 20 minutes. The fire started as described, the flames reached a height of approximately 70 cm and, when they reached the limit of the product's application range, they were almost immediately extinguished.

Test 15: The suspension diluted in pH 11 water from test 14 was stored for 3 months, and its ammonia and pH release were monitored through 250 mL samples collected weekly and subjected to the litmus paper ammonia release test, and pH assessment. After 3 months, the highest pH measured was 6.3, and no emission of free ammonia was detected;

Test 16: The diluted solution/suspension of test 14 was applied under the same test conditions as test 14, with the only difference that the product was allowed to dry on the test straw for 1 week in an environment with controlled air humidity between 30-40% relative humidity. The product had an apparent total drying on the straw. The fire started as described, the flames reached a height of approximately 70 cm and, when they reached the limit of the product's application range, they were almost immediately extinguished.

Test 17: A 20 kg sample of the liquid product was made by process I indicated above, with the composition shown below. All percentages are calculated by weight, on a wet basis.

Ascorbic acid: added to water up to pH 3.6, which corresponded to 0.25% of the total weight, at a temperature of 80° C.; Urea: 9.6%; Ammonium sulfate: 29.65%; Kaolin d50 1.6 μm: 18.42%; Sodium carboxymethyl cellulose (CMC): 0.32%; polypropylene glycol PPG 2000: 2.00%; and Process water: 40.00%.

The liquid product with suspended powders was diluted in water in the proportion of 10% by weight of product on a wet basis, corresponding to a diluted formulation for use of the 6.0% concentration of non-aqueous components, with the following final composition: Urea: 0.96%; Ammonium sulfate: 2.965%; Kaolin d50 1.6 μm: 1.842%; Sodium carboxymethyl cellulose (CMC): 0.032%; Polypropylene glycol PPG 2000: 0.2%; and Process water: 94.0%.

The product diluted in water was spread over a strip of dry wheat straw, in the same controlled fire laboratory test as described in test method A above. The application density was 0.8 L/m², and the period between application of the product and the start of the fire was 20 minutes. The fire started as described above, the flame reached a height of approximately 70 cm, and when reached the limit of the application range of the product were reduced to about 20 cm and then was extinguished. The range of carbonized fuel was advanced by about 50-60 cm within the strip of deposited product.

Although the result was effective in blocking the fire at the limit of the application range, this urea content was considered critical, since it did not block the fire right at the beginning of the product's application range. For this reason, the safe lower limit of urea was considered that of test 14 above. Recalculating on a dry basis, we have the following composition of test 14, to fix the minimum urea content: Urea: 17.43% (DWB); Ammonium sulfate: 48.06% (DWB); Kaolin d50 1.6 µm: 30.71% (DWB); Sodium carboxymethyl cellulose (CMC): 0.53% (DWB); and Polypropylene glycol PPG 2000: 3.345% (DWB).

Tests to Determine the Minimum Ammonium Sulfate Content to be Used:

In the same way as in the methodology to determine the minimum urea content, we performed the tests keeping the averages of the contents of non-aqueous components within the effective ranges (except for urea), reducing the content of ammonium sulfate, and correspondingly increasing the urea content, to maintain the balance at 100% on a dry basis, always calculated with the final content after dilution, according to the tests below:

Test 18: A 20 kg sample of the liquid product was made by process I indicated above, with the composition shown below. All percentages are calculated by weight, on a wet basis.

ascorbic acid: water added until pH 3.8, corresponding to 0.26% by weight at a temperature of 80° C.; Urea: 26.44%; Ammonium sulfate: 12.82%; Kaolin d50 1.6 µm: 18.42%; Sodium carboxymethyl cellulose (CMC): 0.32%; Polypropylene glycol PPG 2000: 2.00%; and Process water: 40.00%.

The liquid product with suspended powders was diluted in water in the proportion of 10% by weight of product on a wet basis, corresponding to a diluted formulation for use in the concentration of 6.0% of non-aqueous components, with the following final composition: Urea: 2.644%; Ammonium sulfate: 1.282%; Kaolin d50 1.6 µm: 1.842%; Sodium carboxymethyl cellulose (CMC): 0.032%; Polypropylene glycol PPG 2000: 0.2%; and Process water: 94.0%.

The pH of the diluted solution was 6.5. The product diluted in water was spread on dry wheat straw that covers a refractory brick surface, according to the controlled fire laboratory test described as test method A above. Application was at a density of 1.0 L/m², and the period between product application and the start of the fire was 20 minutes. The fire started as described, the flames reached a height of approximately 70 cm and, when they reached the limit of the product's application range, they were almost immediately extinguished.

Test 19: The diluted solution/suspension of test 18 was applied under the same test conditions as test 18, with the only difference that the product was allowed to dry on the test straw for 1 week in an environment with controlled air humidity between 30-40% relative humidity. The product had an apparent total drying on the straw. The fire started as described, the flames reached a height of approximately 70 cm and, when they reached the limit of the product's application range, they were almost immediately extinguished.

Test 20: A 20 kg sample of the liquid product was made by process I indicated above, with the composition indicated below. All percentages are calculated by weight, on a wet basis.

Ascorbic acid: added to water up to pH 3.6, which corresponded to 0.25% of the total weight, at a temperature of 80° C.; Urea: 27.76%; Ammonium sulfate: 11.5%; Kaolin d50 1.6 µm: 18.42%; Sodium carboxymethyl cellulose (CMC): 0.32%; Polypropylene glycol PPG 2000: 2.00%; and process water: 40.00%.

The liquid product with suspended powders was diluted in water in the proportion of 10% by mass of product on a wet basis, corresponding to a diluted formulation for use in the concentration of 6.0% of non-aqueous components, with the following final composition: Urea: 2.776%; Ammonium sulfate: 1.15%; Kaolin d50 1.6 µm: 1.842%; Sodium carboxymethyl cellulose (CMC): 0.032%; Polypropylene glycol PPG 2000: 0.2%; and Water with pH 11.2: 94.0%.

The product diluted in water was spread over a strip of dry wheat straw, in the same controlled fire laboratory test as described in test method A above. The application density was 0.8 L/m², and the period between application of the product and the start of the fire was 20 minutes. The fire started as described, the flames reached a height of approximately 70 cm and, when they reached the limit of the product's application range, they were reduced to about 20 cm and then extinguished. The range of carbonized fuel was advanced by about 50-60 cm within the strip of deposited product.

Although the result was effective in blocking the fire at the limit of the application range, this content of ammonium sulfate was considered critical, since it did not block the fire right at the beginning of the product's application range. For this reason, the safe lower limit of ammonium sulfate was considered that of test 18 above. Recalculating on a dry basis, we have the following composition of test 18, to fix the minimum content of ammonium sulfate: Urea: 44.07% (DWB); Ammonium sulfate: 21.37% (DWB); Kaolin d50 1.6 µm: 30.71% (DWB); Sodium carboxymethyl cellulose (CMC): 0.53% (DWB); and Polypropylene glycol PPG 2000: 3.345% (DWB).

Determination of the minimum levels for kaolin:

A methodology like that used to determine the levels of urea and ammonium sulfate was used for the levels of kaolin. An average ratio between urea and ammonium sulfate was fixed, and the kaolin content was reduced to the safe working limit in the diluted product.

Test 21: A 20 kg sample of the liquid product was made by process I indicated above, with the composition indicated below. All percentages are calculated by weight, on a wet basis.

ascorbic acid: water added to pH 4.0, which corresponds to 0.26% by weight at a temperature of 80° C.; Urea: 25.1%; Ammonium sulfate: 21.38%; Kaolin d50 1.6 µm: 11.2%; Sodium carboxymethyl cellulose (CMC): 0.32%; Polypropylene glycol PPG 2000: 2.00%; and Process water: 40.00%.

The liquid product with suspended powders was diluted in water in the proportion of 10% by weight of product on a wet basis, corresponding to a diluted formulation for use in the concentration of 6.0% of non-aqueous components, with the following final composition: Urea: 2.51%; Ammonium sulfate: 2.138%; Kaolin d50 1.6 µm: 1.12%; Sodium carboxymethyl cellulose (CMC): 0.032%; Polypropylene glycol PPG 2000: 0.2%; and Process water: 94.0%.

The pH of the diluted solution was 6.4. The product diluted in water was spread on dry wheat straw that covers a refractory brick surface, according to the controlled fire laboratory test described as test method A above. An application density of 1.0 L/m² was used, and the period between the application of the product and the start of the fire was 20 minutes. The fire started as described, the flames reached a height of approximately 70 cm and, when they reached the limit of the product's application strip, they were almost immediately extinguished.

Test 22: The diluted solution/suspension of test 21 was applied under the same test conditions as test 21, with the only difference that the product was allowed to dry on the test straw for 1 week in an environment with controlled air humidity between 30-40% relative humidity. The product had an apparent total drying on the straw. The fire started as described, the flames reached a height of approximately 70 cm and, when they reached the limit of the product's application strip, they were almost immediately extinguished.

Test 23: A 20 kg sample of the liquid product was made by process I indicated above, with the composition shown below. All percentages are calculated on a weight basis, on a wet basis.

Ascorbic acid: added to water up to pH 3.6, which corresponded to 0.25% of the total weight, at a temperature of 80° C.; Urea: 25.48%; Ammonium sulfate: 21.7%; Kaolin d50 1.6 μm: 10.5%; Sodium carboxymethyl cellulose (CMC): 0.32%; Polypropylene glycol PPG 2000: 2.00%; and process water: 40.00%.

The liquid product with suspended powders was diluted in water in the proportion of 10% by weight of product on a wet basis, corresponding to a diluted formulation for use in the concentration of 6.0% of non-aqueous components, with the following final composition: Urea: 2.548%; Ammonium sulfate: 2.17%; Kaolin d50 1.6 μm: 1.05%; Sodium carboxymethyl cellulose (CMC): 0.032%; Polypropylene glycol PPG 2000: 0.2%; and Water with pH 11.2: 94.0%.

The product diluted in water was spread over a strip of dry wheat straw, in the same controlled fire laboratory test described in test method A above. The application density was 0.8 L/m², and the period between application of the product and the start of the fire was 20 minutes. The fire started as described, the flames reached a height of approximately 70 cm and, when they reached the limit of the product's application range, they were reduced to about 20 cm and then extinguished. The range of carbonized fuel was advanced by about 50-60 cm within the strip of deposited product.

Although the result was effective in blocking the fire at the limit of the application range, this kaolin content was considered critical, since it did not block the fire right at the beginning of the product's application range. For this reason, the lower safe limit of kaolin was considered that of test 21 above. Recalculating on a dry basis, we have the following composition from test 21, to fix the minimum kaolin content: Urea: 41.83% (DWB); Ammonium sulfate: 35.63% (DWB); Kaolin d50 1.6 μm: 18.67% (DWB); Sodium carboxymethyl cellulose (CMC): 0.53% (DWB); and Polypropylene glycol PPG 2000: 3.33% (DWB).

Determination of the minimum levels for the polypropylene glycol humectant: To determine the minimum content of PPG 2000, the following tests were carried out:

Test 24: A 1 kg sample of the liquid product was made by process I indicated above, with the composition shown below. All percentages are calculated on a weight basis, on a wet basis.

Ascorbic acid: added to water up to pH 3.6, which corresponded to 0.22% of the total weight, at a temperature of 80° C.; Urea: 25.1%; Ammonium sulfate: 21.38%; Kaolin d50 1.6 μm: 12.2%; Sodium carboxymethyl cellulose (CMC): 0.32%; Polypropylene glycol PPG 2000: 1.00%; and Process water: 40.00%.

The liquid product with suspended powders was diluted in water in the proportion of 10% by weight of product on a wet basis, corresponding to a diluted formulation for use in the concentration of 6.0% of non-aqueous components, with the following final composition: Urea: 2.51%; Ammonium sulfate: 2.138%; Kaolin d50 1.6 μm: 1.22%; Sodium carboxymethyl cellulose (CMC): 0.032%; Polypropylene glycol PPG 2000: 0.1%; and Process water: 94.0%.

Then, the diluted solution/suspension was applied to green leaves of eucalyptus (*Mimosa scrabella*) in the proportion of 1 L/m² of leaf surface area, on one single face. The samples were allowed to dry in the open air, at an average temperature of 22° C. and an average relative humidity of 35%, for 48 h. The visual aspect of the substrate was observed throughout the drying process, and the film formed was homogeneous, with no droplet formation on the leaves, nor spherical concentrates in the dry product.

Test 25: A 1 kg sample of the liquid product was made by process I indicated above, with the composition indicated below. All percentages are calculated on a weight basis, on a wet basis.

Ascorbic acid: added to water up to pH 3.6, which corresponded to 0.22% of the total weight, at a temperature of 80° C.; Urea: 25.1%; Ammonium sulfate: 21.38%; Kaolin d50 1.6 μm: 12.7%; Sodium carboxymethyl cellulose (CMC): 0.32%; Polypropylene glycol PPG 2000: 0.5%; and Process water: 40.00%.

The liquid product with suspended powders was diluted in water in the proportion of 10% by weight of product on a wet basis, corresponding to a diluted formulation for use in the concentration of 6.0% of non-aqueous components, with the following final composition: Urea: 2.51%; Ammonium sulfate: 2.138%; Kaolin d50 1.6 μm: 1.27%; Sodium carboxymethyl cellulose (CMC): 0.032%; Polypropylene glycol PPG 2000: 0.05%; and water with pH 11.2: 94.0%.

Then, the diluted solution/suspension was applied to green leaves of eucalyptus (*Mimosa scrabella*) in the proportion of 1 L/m² of leaf surface area, on one single face. The samples were allowed to dry in the open air, at an average temperature of 22° C. and an average relative humidity of 35%, for 48 h. The visual aspect of the substrate was observed throughout the drying process, and the film formed was homogeneous, with no droplet formation on the leaves, nor spherical concentrates in the dry product.

As a result of these tests, we consider the proportion on a wet basis between 0.5% and 2% of PPG 2000 to be safe. Calculating on a dry basis we have the range between 0.5/0.6=0.83% (DWB) and 2/0.6=3.33% (DWB) as a safe range of effectiveness.

According to the performed tests, we have the following limits for the formulation with polypropylene glycol (PPG 2000) as humectant, in dry weight: Urea: from 17.43% to 44.07% (DWB); Ammonium Sulfate: from 21.37% to 48.06% (DWB); Kaolin d50 1.6 μm: from 18.67% to 40.53% (DWB); Sodium carboxymethyl cellulose (CMC): from 0.1% to 0.8% (DWB); Polypropylene glycol PPG 2000: from 0.83% to 3.33% (DWB), and water: between 38% and 50%, in total weight of the concentrated solution dispersion.

Tests for Using the Dynwet® 800N Humectant as an Alternative to PPG 2000:

The previous tests were carried out with polypropylene glycol (PPG) as a wetting agent. The following tests were conducted to alternative formulation using the humectant alkoxylated alcohol (a non-ionic surfactant) Dynwet® 800N from BYK Industries:

Test 26: A 1 kg sample of the liquid product was made by process I indicated above, with the composition indicated below. All percentages are calculated by weight, on a wet basis. The proportion of Dynwet® 800N used was that recommended by the manufacturer.

Ascorbic acid: added to water up to pH 3.8, which corresponded to 0.22% of the total weight, at a temperature of 80° C.; Urea: 25.4%; Ammonium sulfate: 21.58%; Kaolin d50 1.6 µm: 12.2%; Sodium carboxymethyl cellulose (CMC): 0.32%; Dynwet® 800N: 0.5%; and Process water: 40.00%;

The liquid product with suspended powders was diluted in water in the proportion of 10% by weight of product on a wet basis, corresponding to a diluted formulation for use in the concentration of 6.0% of non-aqueous components, with the following final composition: Urea: 2.54%; Ammonium sulfate: 2.158%; Kaolin d50 1.6 µm: 1.22%; Sodium carboxymethyl cellulose (CMC): 0.032%; Dynwet® 800N: 0.05%; and water: 94.0%.

Then, the diluted solution/suspension was applied to green leaves of eucalyptus (Mimosa scrabella) in the proportion of 1 L/m² of leaf surface area, on one single face. The samples were allowed to dry in the open air, at an average temperature of 22° C. and an average relative humidity of 35%, for 48 h. The visual aspect of the substrate was observed throughout the drying process, and the film formed was homogeneous, with no droplet formation on the leaves, nor spherical concentrates in the dry product.

Test 27: A 1 kg sample of the liquid product was made by process I indicated above, with the composition shown below. All percentages are calculated by weight, on a wet basis.

Ascorbic acid: added to water up to pH 3.6, which corresponded to 0.22% of the total weight, at a temperature of 80° C.; Urea: 25.1%; Ammonium sulfate: 21.38%; Kaolin d50 1.6 µm: 12.9%; Sodium carboxymethyl cellulose (CMC): 0.32%; Dynwet® 800N: 0.3%; and Process water: 40.00%.

The liquid product with suspended powders was diluted in water in the proportion of 10% by weight of product on a wet basis, corresponding to a diluted formulation for use in the concentration of 6.0% of non-aqueous components, with the following final composition: Urea: 2.51%; Ammonium sulfate: 2.138%; Kaolin d50 1.6 µm: 1.29%; Sodium carboxymethyl cellulose (CMC): 0.032%; Dynwet® 800N: 0.03%; and water with a pH of 11.2: 94.0%.

Then, the diluted solution/suspension was applied to green leaves of eucalyptus (Mimosa scrabella) in the proportion of 1 L/m² of leaf surface area, on one single face. The samples were allowed to dry in the open air, at an average temperature of 22° C. and an average relative humidity of 35%, for 48 h. The visual aspect of the substrate was observed throughout the drying process, and the film formed was homogeneous, with no droplet formation on the leaves, nor spherical concentrates in the dry product.

From the results of these tests, and considering the manufacturer's recommendation, considering the ratio on a wet basis between 0.3% and 1% of Dynwet® 800N as safe. Calculating on a dry basis we have the range between 0.3/0.6=0.53% (DWB) and 1/0.6=1.67% (DWB) as a safe range of effectiveness.

Determination of the Effectiveness of the Dicyandiamide as Nitrification Inhibitor:

The literature recommends a proportion of use of dicyandiamide corresponding to 7.5% of the available volatile nitrogen.[(5), (6)] Taking in account the volatile nitrogen derived from urea, we can calculate the limits of DCD content safer for the case, that is, use of 7.5% of the urea nitrogen in limits of urea contents.

At this point, as we have to introduce a component whose dosage is a function of another component, it is useful to consider the limits as g/L of diluted solution/suspension, as this is the variable to be effectively applied to the vegetable substrate to be protected from fire. After this calculation, a retroactive calculation will be made for the contents on a dry basis, thus eliminating the water variable from the concentrated product, which can conveniently be added in the appropriate proportion to maintain easy dispersion/homogenization, considering ambient temperatures of storage and use.

To calculate the concentrations in g/L of solution, the apparent density of the solution/suspension was determined in the extreme cases of lower urea content combined with higher ammonium sulfate content, and vice versa, with the following results:

Density with higher ammonium sulfate content: 1.015 g/mL

Density with lower ammonium sulfate content: 1.013 g/mL

Because the density difference was insignificant, we will use an average density of 1.014 g/mL in all limit calculations:

Minimum urea content (test 14): 1.041% by weight, where:

$$C_{(g/L),component}=1000\times d_{(g/mL)}\times\tau_{(g/g)}$$

Where:

$C_{(g/L),component}$=Concentration, in g of component/L of diluted solution/suspension;

$d_{(g/mL)}$=apparent density of the diluted suspension/solution, in g/mL;

$\tau_{(g/g)}$=Weight title of the component in relation to the suspension/solution;

So:

$$C_{(g/L),Urea}=1000\times1.014\times0.01041=10.556\text{ g/L}$$

As urea contains 45% nitrogen[(11)]:

$C_{(g/L),DCD\ min.}=10.556\times0.45\times7.5\%=0.356$ g/L, or in form of Weight title:

$\tau_{(g/g),DCD\ min.}=0.356/1000/1.014=0.000351$, that is, 0.0351% by weight of diluted product;

Considering that the concentration of the product in the final diluted solution/suspension is 6%, we will have for the minimum concentration of DCD in dry basis:

$$\%_{min.\ DCD}=0.0351\%/0.06=0.585\%\text{ (DWB)}$$

Likewise, we will have, for the maximum DCD concentration:

Maximum % of urea by weight: 2.644%

$C_{(g/L),\ max\ DCD}=1000\times1.014\times0.02644\times0.45\times7.5\%=0.9048$ g/L, or, in the form of weight title:

$\tau_{(g/g),\ max\ DCD}=0.9048/1000/1.014=0.0008923$, that is, 0.0892% by weight of diluted product;

Considering that the concentration of the product in the final diluted solution/suspension is 6%, we will have for the maximum concentration of DCD in dry basis:

$$\%_{max.\ DCD}=0.0892\%/0.06=1.49\%\text{ (DWB)}$$

Finally, according to the tested weight contents, we have the limits of content of the components, in weight of the component per total weight of non-aqueous components:

For formulation with polypropylene glycol as a wetting and surface tension reducing agent: Urea: from 17.43% to 44.07% (DWB); Ammonium Sulfate: from 21.37% to 48.06% (DWB); Kaolin d50 1.6 µm: from 18.67% to 40.53% (DWB); Sodium carboxymethyl cellulose (CMC): from 0.1% to 0.8% (DWB); Polypropylene glycol PPG 2000: from 0.83% to 3.33% (DWB); Dicyandiamide (DCD): from 0.585% to 1.49% (DWB); and Water: between 38% and 50% by total weight of the solution/dispersion.

For formulation with Dynwet® 800 N as a wetting and surface tension reducing agent: Urea: from 17.43% to 44.07% (DWB); Ammonium Sulfate: from 21.37% to 48.06% (DWB); Kaolin d50 1.6 µm: from 18.67% to 40.53% (DWB); Sodium carboxymethyl cellulose: from 0.1% to 0.8% (DWB); Dynwet® 800N from BYK Industries: 0.53% to 1.67% (DWB); Dicyandiamide (DCD): from 0.585% to 1.49% (DWB); and Water: between 38% and 50% by total weight of the solution/dispersion.

One more large-scale fire test was carried out in forest plots, to prove the effectiveness of the product object of the present invention in the field:

Test 28: a large block fire test in a forest plot with a rectangular area of 40 m×11 m, was prepared, under the following conditions:

According to FIG. 1, a forest plot presented the following conditions: Format: rectangular; Dimensions: 40 m×11 m; Direction of the plot axis in the path of fire advance (EA): 37° from the North (N); Wind direction (V): 170°; Burning plot orientation (OP): 217° N; Slope of the burning plot axis (IE): 15%; hill orientation (OL): SW (236°); Hill slope (IL): 18.5%; and Altitude: 609 m;

The vegetable fuel (substrate) consisted of a dense, continuous cover, of considerable height, composed of shrubs Erica *australis* and *Ulex europaeus*. Samples were taken to calculate the height of vegetation and cover the leaves in the soil. The data are summarized in table 13.

TABLE 13

Parameters of fuel vegetation for test 28:

| | |
|---|---|
| Thickness of leaf cover on the ground (cm) | 6.2 |
| Ground coverage (%) | 100 |
| Coverage of *Ulex europaeus* (%) | 42 |
| Coverage of *Erica australis* (%) | 58 |
| Total shrub coverage (%) | 100 |
| Average total height of shrubs (m) | 2.82 |
| Dry canopy start height (m) | 0.33 |
| Green canopy start height (m) | 1.36 |

The weather conditions during the test were monitored by a mobile unit and are shown in table 14.

TABLE 14

Weather conditions for test 28:

| | |
|---|---|
| Fire schedule hours | 12:03 to 12:09 |
| Air temperature (° C.) | 17.4 |
| Relative humidity (%) | 32 |
| Solar radiation (W/m$^2$) | 453 |
| Wind speed at 2 m height (m/s) | 0.88 |
| Wind speed range at 2 m height (m/s) | 0.25 to 1.95 |
| Dry canopy start height (m) | 0.33 |
| Wind direction | SSE (170°) |

The product covered by this patent was produced according to process I, in the following weight proportions: Urea: 38.11% (DWB); Ammonium sulfate: 29.85% (DWB); Kaolin d50 1.6 µm: 27.4% (DWB); Sodium carboxymethyl cellulose (CMC): 0.31% (DWB); Polypropylene glycol PPG 2000: 3.33% (DWB); Dicyandiamide (DCD): 1% (DWB); and Process water: 40% by weight, relative to the total weight of the concentrated solution/suspension.

The pH of the process water was adjusted with ascorbic acid to pH 3.8. The mixing temperature of the process water was 80° C.

After production and storage for 3 days, the concentrated product was diluted in the proportion of 12.5% by weight of concentrated solution/suspension to 87.5% of water, resulting in a concentration of 7.5% of non-aqueous products in weight. The pH of the diluted solution was 6.2. The concentration of the components in the water after dilution was:

Urea: 2.86%; Ammonium sulfate: 2.24%; Kaolin d50 1.6 µm: 2.052%; Sodium carboxymethyl cellulose (CMC): 0.023%; Polypropylene glycol PPG 2000: 0.25%; and Dicyandiamide (DCD): 0.075%.

The product was applied to a 2 m wide strip approximately 5 m from the opposite end of the fire, in the proportion of 4 L/m$^2$ of land. The time between the application of the product and the start of the fire was approximately 2 hours.

Fire was started at the end opposite to the application of the diluted product, and the flames quickly reached an estimated 6 m in height. However, it was completely extinguished when it reached the range where the product diluted in water was applied.

From the precepts presented in this specification, and considering the results showed here, it will be clear to a technician skilled in the art that changes can be made in the details of these formulations without prejudice to the objects of this invention. For example, one can modify, remove additive or adding additives with additional functions, such as increasing the stability of the suspension, product durability, resistance to microorganisms, dispersibility or other functions, without altering the main inventive novelty of the product, which is to completely block the passage of fire, acting as a true chemical firebreak, for a long time after application.

BIBLIOGRAPHIC REFERENCES

1. VICK, Mariana. Por que a Australia enfrenta uma onda de incêndios. Nexo [online]. Sao Paulo, January 2020. Available at: <https://www.nexojornal.com.br/expresso/2020/01/03/Por-que-a-Austr % C3% Allia-faces-a-escalada-of-inc % C3% AAndios>. Accessed on: Jan. 6, 2020.
2. Schaber, Peter; Colson, James; Higgins, Steven; Thielen, Daniel; Anspach, Bill; Brauer, Jonathan. (2004). Thermal Decomposition (Pyrolysis) of Urea in an Open Reaction Vessel. Thermochimica Acta. 424. 131-142. 10.1016/j.tca.2004.05.018.
3. Halstead, W. (2007). Thermal decomposition of ammonium sulfate. Journal of Applied Chemistry. 20. 129-132. 10.1002/jctb.5010200408.
4. CETESB—Companhia Ambiental do Estado de São Paulo: Mortandade de peixes. Alterações físicas e químicas. Matéria orgânica e nutrientes. São Paulo, 2019. Available at: <https://cetesb sp.gov.br/mortandade-peixes/alteracoes-fisicas-e-quimicas/materia-organica-e-nutrientes/>. Accessed on: Dec. 16, 2019.
5. SOARES. Johnny R. Emissão de N$_2$O e opções de mitigação pela aplicação de fertilizantes nitrogenados no cultivo de cana-de-açúcar. Thesis (Doctorate in Tropical and Subtropical Agriculture)—Instituto Agronômico de Campinas (IAC). 2006.
6. MARCELINO. Rafael. Inibidor de nitrificação em fertilizantes nitrogenados e rendimento de milho. Dissertation (Master in Tropical and Subtropical Agriculture)—Instituto Agronomico de Campinas (IAC). 2009.
7. Ystral—110% Mixing Solutions. Machines. Dispermix. Available at: <https://ystratcom/en/machines/dispermix/>. Accessed on: Dec. 16, 2019.
8. IUPAC-NIST Solubility Database. Available at: <https://srdata.nist.gov/solubility/sol_main_search.aspx>. Accessed on: Dec. 27, 2019.
9. Applications of CarboxymethylCellulose Sodium in the Ceramic Glaze Slurry. Available at: <https://celluloseether.com/wp-content/uploads/2014/07/Applicabons-of-Carboxymethyl-Cellulose-Sodium-in-the-Ceramic-Glaze-Slurry.pdf>. Accessed on: Jan. 3, 2020.
10. NEVES, Kézia Pereira Liborio; MELO F °, João de almeida. Produção de metacaulinita a partir de caulim da região de Presidente Figueiredo, A M. In: CONGRESSO TÉCNICO CIENTÍFICO DA ENGENHARIA E DA AGRONOMIA—CONTECC'2018, 2018, Maceió. Available at: <http://www.confea.org.br/sites/default/files/antigos/contecc2018/civil/166_pdmapdcdrdpfa.pdf>. Accessed on: Jan. 3, 2020.
11. SANTIAGO, Antonio Dias; ROSSETTO, Raffaella: Adubação mineral [on line]. Available at: <https://www.agencia.cnptia.embrapa.br/gestor/cana-de-acucar/arvore/CONTAG01_38_711200516717.html> Accessed on: Jan. 8, 2020.

The invention claimed is:

1. A fire retardant and fire blocking composition for use in forest fires, comprising a liquid composition with dissolved and suspended powders, comprising the following range of components:
   a nitrogen compound generator of non-combustible gases when subjected to fire: from 17.43% to 44.07% by weight, on Dry Weight Basis (DWB);
   a compound of weak acid character generator of non-combustible gases when subjected to fire: from 21.37% to 48.06% (DWB);
   an adhesion-promoting compound: from 18.67% to 40.53% (DWB);
   a dispersion and suspension facilitating compound: from 0.1% to 0.8% (DWB);
   a wetting and surface tension reducing agent: 0.83% to 3.33% (DWB); and
   a nitrification inhibiting agent: from 0.585% to 1.49% (DWB); complemented with
   a solvent water regulated with organic acidity regulating component until a pH between 3.2 and 4.0 is obtained: between 38% and 50%, in total weight of the solution/suspension,
   wherein the nitrogen compound generator is urea;
   wherein the dispersion and suspension facilitating compound is sodium carboxymethyl cellulose; and
   wherein the adhesion-promoting compound is kaolin with a particle diameter d50 ranging from 1 to 10 μm.

2. The fire retardant and fire blocking composition for use in forest fires according to claim 1, wherein the compound with a weak acid character that generates incombustible gases is ammonium sulphate.

3. The fire retardant and fire blocking composition for use in forest fires according to claim 1, wherein the wetting and surface tension reducing agent is polypropylene glycol with an average molecular weight of 2000.

4. The fire retardant and fire blocking composition for use in forest fires according to claim 1, wherein the nitrification inhibiting agent is dicyandiamide (DCD).

5. The fire retardant and fire blocking composition for use in forest fires according to claim 1, wherein the acidity regulating component is ascorbic acid.

6. The fire retardant and fire blocking composition for use in forest fires according to claim 1, wherein the wetting and surface tension reducing agent is an alkoxylated alcohol Dynwet® 800N or similar, in the proportion 0.53 to 1.67% (DWB).

7. The fire retardant and fire blocking composition for use in forest fires according to claim 1, wherein the nitrification inhibitor agent is 3,4-dimethylpyrazole phosphate (DMPP) in the same proportions.

8. The fire retardant and fire blocking composition for use in forest fires according to claim 1, wherein the acidity regulating component is citric acid.

9. The fire retardant and fire blocking composition for use in forest fires according to claim 1, wherein the acidity regulating component is tartaric acid.

10. The fire retardant and fire blocking composition for use in forest fires according to claim 1, wherein the acidity regulating component is fumaric acid.

11. The fire retardant and fire blocking composition for use in forest fire according to claim 1, comprising the following composition:
    technical urea: 38.11% (DWB);
    ammonium sulphate: 29.85% (DWB);
    aolin d50 1.6 μm: 27.4% (DWB);
    sodium carboxymethyl cellulose (CMC): 0.31% (DWB);
    polypropylene glycol with average molecular weight 2000: 2.33% (DWB); and
    dicyandiamide (DCD): 1% (DWB), supplemented with solvent water with acidity regulator ascorbic acid dosed until pH 3.8: 40% by weight, relative to the total weight of the concentrated solution/suspension.

12. FIRE RETARDANT AND FIRE BLOCKING COMPOSITION FOR USE IN FOREST FIRES, according to claim 1, comprising the following composition:
    Incombustible gas generator when submitted to fire technical urea: 39.2% (DWB)
    Gas-generator compound of weak acid character ammonium sulphate: 30.71% (DWB)
    Adhesion promoting compound kaolin d50 1.6 μm: 28.18% (DWB)
    Dispersion and suspension facilitator sodium carboxymethyl cellulose (CMC): 0.31% (DWB)
    Wetting agent Alkoxylated alcohol Dynwet® 800N from BYK Industries: 0.6% (DWB)
    Nitrification inhibiting agent dicyandiamide (DCD): 1% (DWB)
    Solvent process water: 40% by weight, relative to the total weight of the concentrated solution/suspension
    Acidity regulator ascorbic acid: dosed to pH 3.8 in process water.

13. PROCESS OF PREPARATION OF THE FIRE RETARDANT AND FIRE BLOCKING COMPOSITION FOR USE IN FOREST FIRE, according to claim 1, comprising the following steps:
    Adding the concentration water to a jacketed vessel with indirect heating by water steam, with a high turbulence and dispersion stirrer, of the Dispermix® type or equivalent;
    After heating to a temperature between 60° C. and 80° C., adding the acidity regulating agent until reaching the determined pH;

Adding the incombustible mineral adhesion-promoting agent, and dispersing it in the medium under agitation, keeping the temperature controlled;

Turning the water steam flow off, and adding urea and ammonium sulphate under stirring;

Finally, after the urea and ammonium sulphate dissolution time, adding the dispersion facilitating agent, the wetting agent and the nitrification inhibiting agent;

Waiting for the concentrated solution/suspension to cool, and packing it in closed containers.

* * * * *